United States Patent
Belo et al.

(10) Patent No.: US 11,897,480 B1
(45) Date of Patent: Feb. 13, 2024

(54) VEHICLE SCHEDULING BASED ON OCCUPANT PREFERENCES

(71) Applicant: Zoox, Inc., Foster City, CA (US)

(72) Inventors: David Martins Belo, San Francisco, CA (US); Johannes Edren, Belmont, CA (US); Johannes Andreas Huennekens, Los Gatos, CA (US); Ella Strack, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 432 days.

(21) Appl. No.: 17/126,806

(22) Filed: Dec. 18, 2020

(51) Int. Cl.
| | |
|---|---|
| *G06Q 50/30* | (2012.01) |
| *G06Q 10/02* | (2012.01) |
| *B60W 40/08* | (2012.01) |
| *B60W 40/107* | (2012.01) |
| *B60W 40/105* | (2012.01) |
| *G06Q 10/0631* | (2023.01) |

(52) U.S. Cl.
CPC .......... *B60W 40/08* (2013.01); *B60W 40/105* (2013.01); *B60W 40/107* (2013.01); *G06Q 10/02* (2013.01); *G06Q 10/06312* (2013.01); *G06Q 50/30* (2013.01); *B60W 2540/043* (2020.02); *B60W 2540/047* (2020.02); *B60W 2556/45* (2020.02)

(58) Field of Classification Search
CPC ... G06Q 10/02; G06Q 50/30; G06Q 10/06312
See application file for complete search history.

(56) References Cited

U.S. PATENT DOCUMENTS

| | | | |
|---|---|---|---|
| 10,421,465 B1 | 9/2019 | Jutkowitz et al. | |
| 10,486,485 B1 | 11/2019 | Levinson et al. | |
| 10,688,841 B1 | 6/2020 | Chen et al. | |
| 2017/0136842 A1* | 5/2017 | Anderson | B60G 17/016 |
| 2017/0282821 A1* | 10/2017 | Zych | G06Q 50/30 |
| 2017/0285646 A1 | 10/2017 | Connor | |
| 2019/0022347 A1 | 1/2019 | Wan et al. | |
| 2019/0172170 A1* | 6/2019 | Jabour | G06Q 30/0645 |
| 2019/0197798 A1* | 6/2019 | Abari | G05D 1/0088 |
| 2019/0318481 A1 | 10/2019 | Chen | |
| 2020/0079385 A1* | 3/2020 | Beaurepaire | B60W 30/025 |
| 2020/0094645 A1 | 3/2020 | Edren et al. | |
| 2020/0130703 A1* | 4/2020 | Pendelton | G06V 40/18 |
| 2020/0139784 A1 | 5/2020 | Sridhar et al. | |
| 2020/0320655 A1* | 10/2020 | Subramanian | G06Q 50/30 |

(Continued)

OTHER PUBLICATIONS

Kuderer et al., "Learning Driving Styles for Autonomous Vehicles from Demonstration", 2015 IEEE International Conference on Robotics and Automation, Jul. 2015 (Year: 2015).*

(Continued)

*Primary Examiner* — Rupangini Singh
(74) *Attorney, Agent, or Firm* — Lee & Hayes, P.C.

(57) ABSTRACT

A system may schedule a vehicle for accommodating preferences of occupants within the vehicle. In some instances, an identity of the occupant may be determined and using the identity, the preference of the occupant may be determined. The vehicle may be schedule for the occupant in instances where the vehicle is able to accommodate the preference. The vehicle may be adjusted or setting(s) of the vehicle may be adjusted based on the preference. The vehicle may travel along a route according to the preferences.

20 Claims, 10 Drawing Sheets

(56) References Cited

U.S. PATENT DOCUMENTS

2020/0365014 A1* 11/2020 Ray .................. G08G 1/096775
2020/0384980 A1  12/2020 Yu et al.

OTHER PUBLICATIONS

Moon et al., "Self-Driving like a Human driver instead of a Robocar: Personalized comfortable driving experience for autonomous vehicles", Machine Learning for Autonomous Driving Workshop at the 33rd Conference on Neural Information Processing Systems, pp. 1-8 (Year: 2019).*

Office Action for U.S. Appl. No. 17/126,761, dated Sep. 26, 2022, Belo, "Dynamic Vehicle Suspension and Steering Adjustment", 15 Pages.

Office Action for U.S. Appl. No. 17/126,761, dated Mar. 27, 2023, Belo, "Dynamic Vehicle Suspension and Steering Adjustment", 14 Pages.

* cited by examiner

VEHICLE SCHEDULING BASED ON OCCUPANT PREFERENCES

BACKGROUND

Vehicles are designed with suspension and steering controls. In some instances, the suspension and/or the steering controls may be adjusted according to preference(s) of occupants (e.g., passengers within the vehicle). For example, vehicles may include suspension or other systems that can be tuned to adjust a performance or characteristic of a vehicle operation according to multiple different predetermined modes (e.g., sport mode, economy mode, comfort mode, etc.). However, conventional systems are limited to a predetermined set of modes. Also, conventional systems apply the selected mode to the vehicle as a whole such that all passengers of the vehicle experience substantially a same performance or ride quality.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
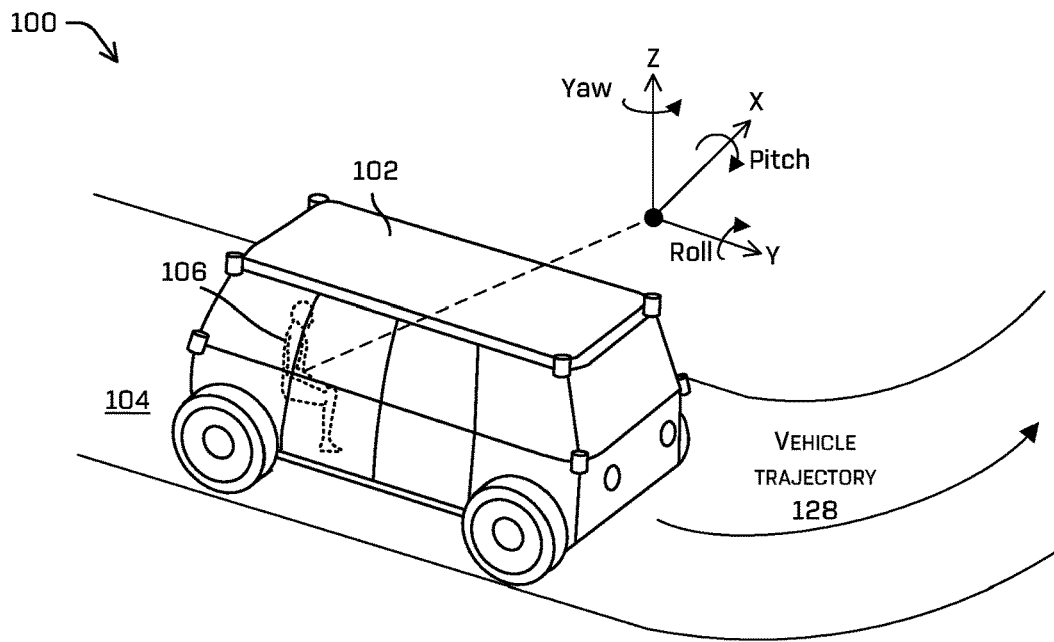
FIG. 1 illustrates an example environment for making one or more adjustment(s) to setting(s) of a vehicle to increase a comfort of one or more occupant(s) within the vehicle.
Figure 1:
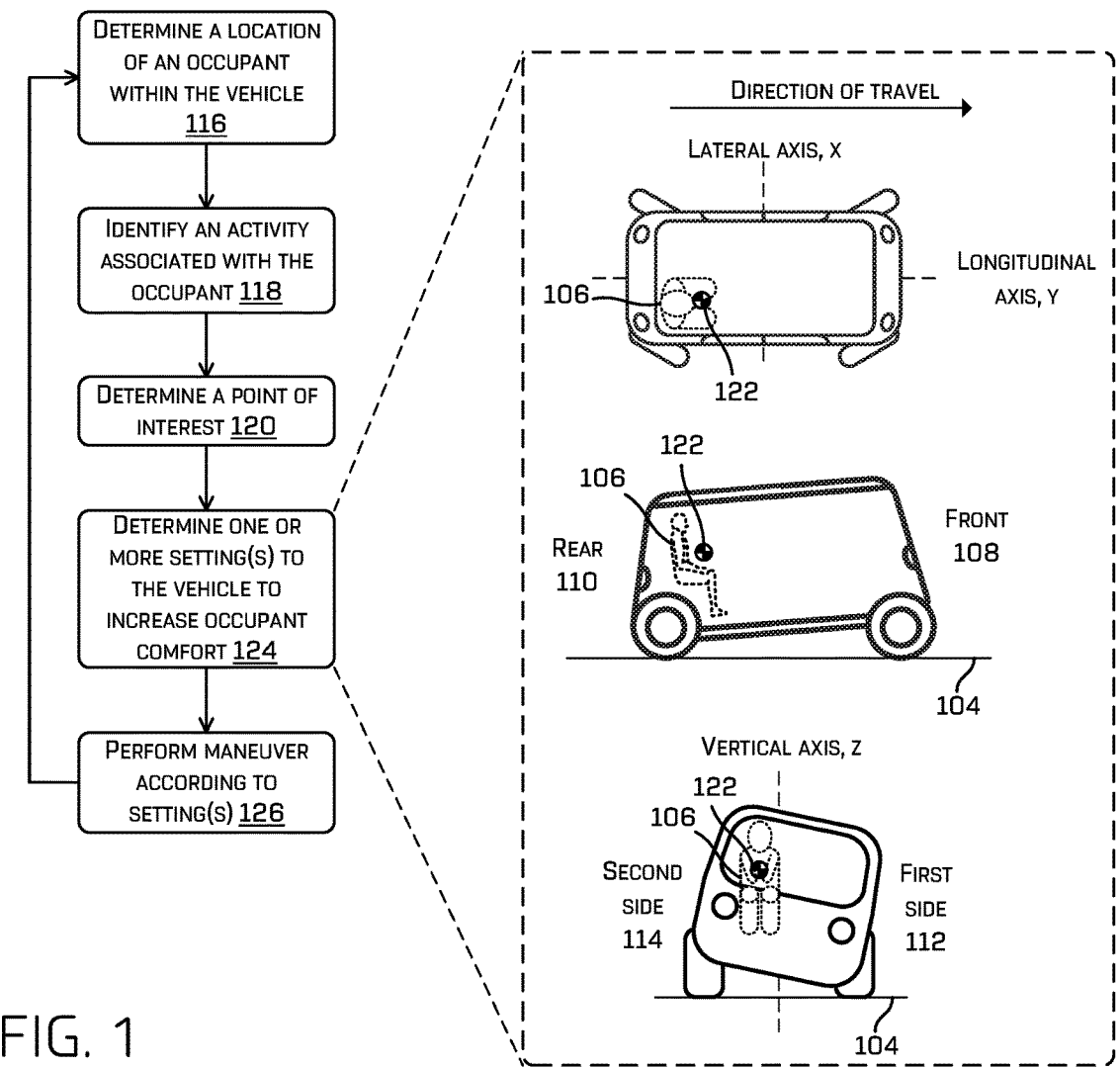

As discussed above, vehicles may have adjustable suspension systems or other system that change performance or ride quality of the vehicle. However, existing systems do not take into account comfort and preferences of individual passengers of the vehicle, nor do they control systems of the vehicle based on sensed conditions within or external to the vehicle. This application describes systems and techniques for adjusting one or more setting(s) of a vehicle based on sensed condition(s) and/or preference(s) of occupant(s) within the vehicle. In some instances, the vehicle may include an autonomous vehicle that travels through an environment along a route. Along the route, the vehicle may perform various maneuvers (e.g., turns, stops, etc.) and travel at different speeds. Additionally, the vehicle may encounter different road conditions (e.g., potholes, speedbumps, cracks, manholes, etc.). To limit the effects of the maneuvers and/or road conditions and to increase a comfort of the occupant(s), sensor(s) within an interior of the vehicle may be used to determine location(s) of the occupant(s), such as which seat(s) the occupant(s) are seated in, activities of the occupant(s), such as whether the occupant(s) are reading a book or working on a laptop or mobile device, and/or characteristic(s) of the occupant(s), such as a weight and/or height. Using the location, the activity, and/or the characteristic(s), a point of interest associated with the occupant(s) or the vehicle may be determined. Generally, the point of interest may represent a reference point or point of rotation about which to model or determine accelerations experienced by the occupant(s). For instance, the point of interest may correspond to a head of the occupant, a position of an object (e.g., book, laptop, mobile device, etc.) held by the occupant, or the like. Operation of one or more systems of the vehicle may be adjusted to optimize a ride comfort for the specific point of interest. For example, certain occupant(s) may be susceptible to motion sickness and adjusting one or more setting(s) of the vehicle may reduce experienced accelerations. As used herein, acceleration includes both positive and negative accelerations, and includes longitudinal acceleration (e.g., speeding up and slowing down), lateral acceleration (e.g., turning), and vertical acceleration (e.g., due to road surface imperfections and/or changes in elevation of the road surface). In some instances, the setting(s) may include making adjustments to steering, suspension, and/or drive mechanisms of the vehicle. For example, altering the steering, suspension, and travel speed may affect accelerations experienced by the occupant(s). In some instances, the preference(s) of the occupant(s), such as climate setting(s), preferred seating direction (e.g., forward facing or rear facing), tolerable accelerations, and/or music interest, may additionally be utilized for adjusting the setting(s). As the vehicle travels in the environment, the setting(s) may be continuously adjusted based on the sensed condition(s), preference(s), and/or feedback received from the occupant(s). Additional details of determining the adjustment(s), configuring the vehicle according to the adjustment(s), and scheduling vehicle(s) for occupant(s) based on preference(s) are discussed herein.

In some instances, the vehicle may include sensor(s) that indicate whether an occupant is seated within a seat in the vehicle. For example, the seat may include a weight sensor, a sensor may be associated with a seatbelt, a camera, or other sensor for knowing whether the occupant is seated, which of multiple seats the occupant is in, a position of the occupant within the seat (e.g., sitting forward, sitting back, slouched, etc.), a size of the occupant (e.g., height), a weight of the occupant, and/or other information. Moreover, in some instances, the sensor(s) may be used for determining whether the seat in which the occupant(s) seated are forward or rearward facing, relative to a direction of travel of the vehicle. Additionally, camera(s) or other sensors within an interior of the vehicle may be used to determine a position of certain parts of the occupant, such as the head of the occupant, the torso of the occupant, and/or the lap of the occupant. In some instances, the position of the occupant and/or a position of a certain part of the body may be utilized for optimizing a ride comfort. For example, accelerations may be calculated for the head of the occupant based on the speed of the vehicle, the position of the head (or a center of gravity (CoG) of the head) within the vehicle, a turning radius of the vehicle, a route of the vehicle, a maneuver to be performed by the vehicle, road conditions, and so forth. In other words, knowing the location of the occupant or a specific part of the occupant, within the vehicle allows for accelerations experienced by the occupant to be determined.

In some instances, the camera(s) may also be utilized to determine, discern, or detect activities of the occupant(s). For example, the occupant(s) may be reading a book, eating/drinking, accessing a mobile device, sleeping, talking with other occupant(s), and so forth. Image analysis may be performed on image data captured by the camera(s) to detect or recognize certain objects (e.g., mobile device, book, etc.) for use in determining the activities. In some instances, the occupant(s) may be categorized according to their activity and the categorization may be taken into account when determining suitable or threshold levels of accelerations for the occupant(s). For example, if the occupant is reading a book, the occupant may be more susceptible to motion sickness based on accelerations as compared to if the occupant is talking on a mobile device or looking out the window.

In some instances, the accelerations experienced by the occupant may be associated with certain thresholds. For example, if the accelerations are within certain desired ranges, the accelerations may be acceptable. In some instances, the thresholds and/or the desired ranges may be associated with, or determined based on, the categorization of the activity and/or preferences of the occupant.

In some instances, the location of the occupant within the vehicle and/or the activity engaged by the occupant may be used for determining the point of interest. Generally, as introduced above, the point of interest may be associated with a point, position, or location about which to determine accelerations experienced by the occupant as the vehicle travels about the environment. In some instances, the vehicle may control one or more systems to minimize acceleration experienced by the point of interest. This may include minimizing the magnitude of acceleration, the duration of acceleration, or both the magnitude and duration of the acceleration. For example, continuing with the above example, if the occupant is reading a book and seated in a particular seat in the vehicle, the point of interest may be associated with a head of the occupant or a center of the book. Additionally or alternatively, the point of interest may be associated with a particular point on or within the vehicle. For example, the point of interest may be represented within three dimensional (3D) coordinate space within, or relative to, the vehicle. In the provided example, because the occupant is reading a book, reducing accelerations experienced by the head of the occupant, or the book, may increase a comfort of the occupant and/or increase a productivity of the occupant reading the book. In other words, knowing the point of interest within the vehicle allows for adjustments to be made to the vehicle for reducing accelerations experienced at the point of interest. As such, the ride comfort of the point of interest may be optimized based on making adjustment(s) to the vehicle.

Using the point of interest, the vehicle (or another communicatively coupled system) may model or determine adjustment(s) to one or more system(s) of the vehicle. In some instances, the vehicle may make one or more adjustment(s) to a steering system of the vehicle, a suspension system of the vehicle, a braking system, and/or a drive system of the vehicle. In some instances, making the adjustment(s) may include altering a planned path of the vehicle from an origin to a destination and/or altering one or more trajectories used to control the vehicle at one or more points along the planned path. For example, as the vehicle travels along a route or within the environment, the vehicle may perform various maneuvers, such as turns, stops, travel at certain speeds, and so forth. Based on the route or the maneuvers along the route, the vehicle (or another communicatively coupled system) may determine accelerations experienced by the occupant or projected to be experienced by the occupant (or the point of interest). In turn, adjustment(s) may be made to the vehicle to minimize the magnitude and/or duration of accelerations of the occupant(s), thereby increasing comfort of the occupant(s). In some instances, the one or more adjustment(s) may be made such that the accelerations are within acceptable ranges or thresholds, as discussed above.

In some instances, the steering system of the vehicle may include front wheel steering, rear wheel steering, and/or four wheel steering. In four-wheel steering, the front two wheels and the rear two wheels may be controlled or actuated by varying amounts (or percentage) for steering the vehicle along a route or as the vehicle performs a maneuver. For example, to make a turn, the front wheels may be actuated by a first amount (or percentage) and the rear wheels may be actuated by a second amount (or percentage). The amount by which the front wheels and/or the back wheels steer may impact accelerations (e.g., lateral and rotational) experienced by the occupant. In some instances, adjusting the steering configuration of the vehicle may impact accelerations experienced about a vertical axis of the vehicle (e.g., yaw axis). Additionally, the longitudinal position of the occupant(s) along a length of the vehicle may affect how the vehicle steers to limit the accelerations experienced by the occupant while the vehicle turns. Moreover, the steering may be adjusted to limit or reduce acceleration experienced by the point of interest.

Additionally, or alternatively, the suspension system may be controlled to adjust a vertical acceleration experienced by at least a portion of the vehicle. The suspension may comprise an active suspension system this is configured to actively control a ride height of the vehicle (or individual struts of the vehicle), or a semi-active suspension system in which damping force and/or spring constant of the suspension system or individual components thereof can be adjusted without adjusting the ride height of the suspension system or component. In the case of an active suspension system, the suspension system may be controlled by varying degrees to adjust at least a portion of a ride height of the vehicle. Additionally, an active suspension may help minimizing vertical acceleration due to small changes in elevation of the road (e.g., uphill or downhill).

In some instances, the vehicle may include a first suspension system located at the front (or first end) of the vehicle and a second suspension system located at the rear (or second end) of the vehicle. The first suspension and the second suspension system may include various components, such as valve blocks, actuators, strut(s), fluid reservoirs, pump(s), accumulator(s), and so forth. In some instances, strut(s) of the first suspension system and the second suspension system may be actuated to similar or different lengths (e.g., travel length). For example, the struts of the first suspension may be extended to a first length and the struts of the second suspension system may be extended to a second length that is less than the first length. As a result, the rear of the vehicle may be disposed closer to the ground than the front of the vehicle. In doing so, if the occupant is positioned closer to the rear of the vehicle, the center of rotation of the vehicle may be lowered to reduce accelerations experienced by the occupant about a lateral axis (e.g., pitch). As another example, in some instances, strut(s) on a first side of the vehicle may be extended to a first length and struts on a second side of the vehicle may be extended to a second length that is less than the first length. Here, if the occupant is positioned closer to the second side of the vehicle, the center of rotation of the vehicle may be lowered to reduce accelerations experienced by the occupant about the longitudinal axis (e.g., roll). However, in some instances, each of the strut(s) of the suspension system(s) may be independently actuatable and extended to respective lengths to have varying degrees of travel. That is, in some instances, the suspension adjustments may be four independent adjustments, one for each strut of the vehicle.

Adjusting the suspension may impact accelerations experienced about the longitudinal axis (e.g., roll) and/or the lateral axis (e.g., pitch) of the vehicle. With the independent adjustment(s) or setting(s) to the suspension system(s), it is possible to create combined roll and pitch to heave motions and adjust accelerations experienced by the occupant(s). In the case of a semi-active suspension system, the suspension system may adjust a damping force and/or spring constant of one or more individual components to minimize vertical acceleration of a particular seating position or other point of interest within the vehicle due to imperfections in the road surface (e.g., potholes, speed bumps, cracks, manholes, etc.).

Additionally, or alternatively, a propulsion system of the vehicle may be controlled to adjust a speed of the vehicle. For example, while turning around a corner, the speed of the vehicle may affect accelerations about one or more axes (e.g., yaw, pitch, or roll). At higher velocities the experienced accelerations may be greater than compared to lower velocities. To sense acceleration, the vehicle may include sensor(s). For example, sensor(s) may measure vibrations, lateral or rotational accelerations. Data received from the sensor(s) may be used to further make adjustments to the vehicle.

Different steering, suspension, braking, and/or propulsion configurations, as well as the speed of the vehicle, may impact accelerations experienced by the occupant. For example, as introduced above, the center of rotation of the vehicle may be controlled to be close to the point of interest in order to optimize ride comfort about a specific part of the vehicle. That is, if the center of rotation of the vehicle is close to the point of interest (e.g., along one or more axes), the point of interest (or the occupant) may experience minimal acceleration. In some instances, aligning the center of rotation with that of, or in close proximity to, the point of interest may include aligning the center of rotation of the vehicle along a vertical axis of the point of interest, a longitudinal axis of the point of interest, and/or a lateral axis of the point of interest. As the vehicle travels along a route, the point of interest may be continuously or periodically monitored and control of the suspension, braking, population and/or other systems may be adjusted accordingly. For example, position and activity of the occupant(s) may be monitored and the point of interest may change if one or more occupants change posture and/or change activity (e.g., take a nap, stop or start reading or using a computing device, etc.). Control of the vehicle may be adjusted based on changes in the point of interest to limit the accelerations experienced by the occupant(s).

In some instances, the steering, suspension, braking, propulsion, and/or other systems of the vehicle may be adjusted based on preference(s) of the occupant(s). For example, the preference(s) may indicate tolerable accelerations, or more generally, whether the occupant prefers minimal accelerations. For example, the occupant may be prone to motion sickness, anxiety, or other ailments and sensitivities. In some instances, to determine whether the occupant(s) have sensitivities, the vehicle (or another communicatively coupled system) may access a profile associated with the occupant and adjust the steering, suspension, and/or speed accordingly. Additionally, the vehicle may be configured to adjust according voice commands of the occupant(s) (e.g., "Please slow down, I'm getting sick"), gesture(s) (e.g., thumbs down to slow down), visual cues (e.g., perspiration, complexion, etc. indicative of the occupant(s) being sick), or may receive input(s) at an interface within the vehicle (e.g., slow down, speed up, etc.). Upon receiving the command(s), input(s), or other feedback, the vehicle (or another communicatively coupled system) may determine adjustments to the vehicle in real-time. Such adjustments may be made dynamically as the vehicle travels about the environment for increasing occupant comfort in real-time.

In some examples, the vehicle may be configured to accommodate different occupants simultaneously. For example, if the vehicle includes a first occupant and a second occupant, the sensor(s) may be used to determine respective activities of the first occupant and the second occupant. For example, the first occupant may be reading and the second occupant may be listening to music on a mobile device. The location of the first occupant and the second occupant may also be determined. Using the locations and the activities, the occupants may be categorized for determining suitable accelerations of the first occupant and the second occupant, respectively.

Additionally, the preference(s) of the occupants may be used to determine respective accelerations. For example, the first occupant may have a smaller range of acceptable accelerations given that the first occupant is reading, as compared to a larger range of accelerations of the second occupant. Additionally, a first point of interest may be determined for the first occupant and a second point of interest may be determined for the second occupant. The points of interest may be averaged or weighted for determining a single point of interest for the vehicle and about which to determine adjustments to the setting(s) of the vehicle. For example, continuing with the example above, as the first occupant may be reading, the single point of interest may be located closer to the first point of interest of the first occupant in one or more directions or along one or more axes (e.g., vertical, longitudinal, lateral). Therein, the point of rotation of the vehicle may be aligned, or closely aligned, along one or more axes as the single point of interest. That is, the vehicle may adjust steering, suspension, and/or speed setting(s) such that the point of rotation of the vehicle is located close to the single point of interest. In some instances, this may, in effect, cause the second occupant to experience greater accelerations as compared to the first occupant. That is, by positioning the point of rotation of the vehicle closer to the first occupant, or the first point of interest, the first occupant may experience less accelerations.

As another example, a first occupant may experience motion sickness and a second occupant may be less susceptible to motion sickness. In such instances, the single point of interest may be located closer to the first point of interest of the first occupant for reducing accelerations of the first occupant. As a result, the second occupant may experience greater accelerations as compared to the first occupant given that the second occupant may have less sensitivities. In such instances, the ride comfort may be optimized for one occupant at the expense of another occupant (e.g., based on sensitivity to motion). In some instances, the accelerations experienced by the second occupant may still be within suitable ranges for accommodating to the second occupant.

Here, the ride comfort may be optimized considering the respective locations, activities, and preference(s) of the occupant. Although the above discussion is with regard to accommodating two occupants, the vehicle may determine the central point of interest for accommodating a greater number of occupants, such as three, four, five, etc.

In some instances, the vehicle may output recommendations associated with optimizing the comfort. For example, if two occupants are reading a book and experience motion sickness, but a first occupant is forward facing and a second occupant is rearward facing, the vehicle may recommend that the second occupant move to an available forward facing seat. This may, in effect, more closely align the center of rotation of the vehicle with that of the point of interest of the occupants, respectively. As a result, the second occupant may experience reduced accelerations.

In some instances, in addition to the preference(s) indicating preferred or acceptable accelerations, the preference(s) may also indicate other preferences of the occupants, such as whether the occupant prefers to be forward facing or rearward facing relative to a direction of travel, whether the occupant prefers a certain climate within the vehicle, whether the occupant prefers a quiet environment, whether the occupant prefers company in the vehicle, whether the occupant prefers certain routes, such as avoiding construction, stop lights, and so forth. The preference(s) may be used for scheduling a vehicle for multiple occupants. For example, occupants with similar preference(s) may be grouped together and scheduled for similar vehicles (e.g., ride share). In such instances, the vehicle may better accommodate the preference(s) of two similar occupants as compared to two occupants having different preference(s). As an example, if a first occupant is susceptible to motion sickness and prefers a slower route to reduce accelerations, the first occupant may be grouped with a second occupant having similar preferences, as compared to a third occupant that prefers a faster route and does not experience motion sickness.

Scheduling vehicles in this manner may better accommodate two like occupant(s) as compared to occupant(s) having different preference(s). In some instances, a remote service, communicatively coupled system, or vehicle fleet management system may manage a fleet of vehicles for scheduling rides for occupants. The fleet management system may coordinate the assignment of vehicles and dispatch of vehicles to the occupants, based on one or more criteria. For example, as part of scheduling a ride, the preference(s) of the occupants may be compared against one another to determine whether the preference(s) have a threshold similarity. Additionally, or alternatively, certain preference(s) may have different weights, such as whether the occupants experience motion sickness. The preference(s) of the occupant may also be updated.

In some instances, the preference(s) may also be used for taking one or more action(s) to increase comfort. For example, the vehicle may output air from a heating ventilation and air condition (HVAC) system, which may help with motion sickness experienced by the occupant. In some instances, the action(s) may be performed in response to user commands or via sensor(s) of the vehicle. For example, the sensor(s) may determine a complexion of an occupant, determine that the occupant looks sick, and may cause air to circulate within the vehicle. Additional action(s) may include opening windows, drawing blinds or shades, and/or adjusting the setting(s) (e.g., steering, suspension, speed, etc.) of the vehicle, as discussed above.

The vehicle (or another communicatively coupled system) may receive feedback from the occupants for increasing comfort of the occupant in future instances. In some instances, the feedback may include whether the occupant was comfortable or uncomfortable, as well as particular occurrences during the route that were uncomfortable. For example, the vehicle may record accelerations experienced by the vehicle and/or the occupant(s) during a route, or during a particular maneuver, and correlate those accelerations with unpleasant experiences. Correlation(s) may also be associated with setting(s) of the vehicle or adjustment(s) that were made to the vehicle. In some instances, acceleration(s) of the occupant(s) may be determined through accessing sensor(s) of devices the occupant (e.g., internal measurement unit on a mobile device).

In light of the above, the present application describes systems and techniques for minimizing accelerations about a point of interest (e.g., lateral and rotation) to increase comfort, reduce motion sickness, and increase productivity of occupants (e.g., working on laptop or cell phone while being transported). In some instances, this may include minimizing the magnitude of acceleration, the duration that the vehicle is accelerating, or both the magnitude and duration of the acceleration. The vehicle (or another communicatively coupled system) may determine adjustment(s) or setting(s) to the vehicle in real-time or on a dynamic basis as the vehicle travels along a route. The adjustment(s) and/or setting(s) may be determined on a per-occupant basis and may include, for example, adjustment(s) to steering, suspension, and/or speed. The adjustment(s) may also include climate control, route planning, braking, and drive direction. Feedback may continuously be received for making adjustment(s) to the vehicle or otherwise accommodating the occupant(s). Additionally, such adjustment(s) may be based on preference(s) of the occupant(s), as determined by accessing profile(s). As such, any number of factors may be used to determine optimal trajectories to optimize user experience (e.g., user comfort). In some instances, user experience may be optimized by moderating accelerations in various linear and angular directions (e.g., to reduce jerking-like travel or other unpleasant motion). Moreover, like occupant(s), or occupant(s) having similar preference(s) and/or sensitivities to motion may be grouped together during rideshares to better accommodate the occupants and increase experiences.

Profiles for a user can include suggested or preconfigured bundles of settings for a user. For example, a profile can correspond to an occupant susceptible to motion sickness due to riding backwards and/or high acceleration maneuvers. Profiles can be associated or suggested for elderly or young occupants. Profiles can be selected based on a planned activity of a user (if a user will use a laptop during the ride, for example). In certain examples, profiles can be selected based on a time or destination associated with a user and/or may be determined based on prior rides and/or feedback provided by a user. For example, a user may use an autonomous taxi service to ride to/from work at a similar time through a work week but for other purposes otherwise. The user may wish to perform work on a laptop while traveling to/from work but not at other times and the profile may be adjusted otherwise. In some examples, a profile can indicate that a user wishes to forgo a standard vehicle comfort setting in order to reduce time to a destination. For example, a profile can indicate that a user wishes to arrive at their destination as expeditiously as possible and a corresponding vehicle may allow for tighter turns and/or more abrupt acceleration accordingly. A profile may be selected by a user when scheduling a ride with an autonomous taxi service. For example, several selections may be presented to the user (e.g., maximum comfort, normal, or minimize time to destination).

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates a pictorial flow diagram of an example process for determining one or more adjustment(s) to make to a vehicle for increasing a comfort of an occupant. In FIG. 1, an example environment 100 is shown that includes a vehicle 102, which may be traveling on a road 104 in a direction of travel. The vehicle 102 may have a vehicle trajectory 128, which in some instances, may be determined by the vehicle 102. For example, the vehicle trajectory 128 may be determined based on sensor data received by one or more sensors on the vehicle 102. Examples of vehicle trajectories are discussed in, for example, U.S. patent application Ser. No. 16/151,607 titled "Trajectory Prediction On Top-Down Scenes," filed Oct. 4, 2018, which is incorporated by reference herein in its entirety for all purposes, and in, for example, U.S. patent application Ser. No. 15/843,512 titled "Trajectory Generation Using Curvature Segments," filed Dec. 15, 2017, which is incorporated by reference herein in its entirety for all purposes. In some instances, sensor data may additionally or alternatively be obtained from teleoperations, other vehicles, sensors in the environment, and so forth.

The vehicle 102 is shown including an occupant 106 (e.g., passenger) seated within a seat inside the vehicle 102. As shown, the occupant 106 may be forward facing relative to a direction of travel of the vehicle 102. However, in some instances, the vehicle 102 may include additional seat(s) for accommodating other occupant(s). In such instances, the occupant 106 or other occupant(s) may be forward facing and/or rearward facing, relative to a direction of travel of the vehicle 102. In some instances, the vehicle 102 may travel in multiple directions for changing the direction of travel.

As the vehicle 102 travels along a route within the environment 100, the vehicle 102 may perform various maneuvers. For example, the vehicle 102 may steer along given routes, may stop, speed up, turn, swerve, change lanes, and so forth. Throughout a ride or during travel, the occupant 106 may experience different amounts of accelerations. In some instances, accelerations may include both positive and negative accelerations, longitudinal acceleration (e.g., speeding up and slowing down), lateral acceleration (e.g., turning), and vertical acceleration (e.g., due to road surface imperfections and/or changes in elevation of the road surface).

For example, as the vehicle 102 turns, the occupant 106 may experience yaw accelerations. The occupant 106 may also experience roll accelerations during turning. Additionally, the occupant 106 may experience pitch accelerations (whether lateral or rotational) during turning, or along uneven surface(s) (e.g., bumps, potholes, etc.). The various accelerations of the occupant 106 may impact comfort of the occupant 106 and/or may lead to illness, such as motion sickness. In some instances, the accelerations may also decrease a productivity of the occupant 106. For example, the occupant 106 may be engaged in one or more activities within the vehicle 102. Without limitation, the activities may include reading a book, listening to music, eating or drinking, sleeping, operating a mobile device (e.g., talking on a mobile phone, watching a movie on a tablet, working on a laptop, etc.), talking to other occupant(s) in the vehicle 102, and so forth.

In some instances, the vehicle 102 may include various sensor(s) (e.g., camera(s)) mounted within an interior of the vehicle 102. In some instances, the sensor(s) may be disposed on a ceiling within the interior, sides of the interior, on headrest(s), in seat(s), etc. The sensor(s) may capture or receive data associated with the interior of the vehicle 102, such as the occupant, and/or may determine the activity. For example, image data may be captured by the camera(s) and analyzed to determine the activity of the occupant 106.

The sensor(s) may also be used for determining a seat occupied by the occupant 106. For example, noted above, the vehicle 102 may have multiple seating location(s). In some instances, the image data of the interior may be analyzed to determine which seat, among the seats in the vehicle 102, the occupant 106 is seated. Additionally, or alternatively, the sensor(s) may include weight sensor(s) disposed seat(s) of the vehicle 102, a sensor associated with a seatbelt, or other sensor for knowing whether the occupant 106 is seated, which of multiple seats the occupant 106 is in, a position of the occupant 106 within the seat, and/or other information. For example, the sensor(s) may be used to determine a height and/or a weight of the occupant 106.

The vehicle 102 may make one or more adjustments or configure to certain setting(s) to accommodate the activity of the occupant 106 reduce experienced accelerations. For example, experienced accelerations may decrease a productivity of the occupant 106 reading. Additionally, the occupant 106 may experience motion sickness or may otherwise be uncomfortable. To increase comfort, productivity, and experience of the occupant 106, the vehicle 102 may include one or more system(s) that adjust to accommodate the occupant 106. For example, the vehicle 102 may include a steering system for steering the vehicle 102, one or more suspension system(s) for increasing traction on the road 104 and reduce vibration, and a drive mechanism for powering the vehicle 102. The vehicle 102 may additionally, or alternatively, other system(s) for permitting operation of the vehicle 102.

The steering system of the vehicle 102 may be capable of two wheel steering and/or four-wheel steering. For example, a front 108 of the vehicle 102 may include two wheels and a rear 110 of the vehicle 102 may include two wheels. In some instances, the two wheels at the front 108 may steer the vehicle 102, the two wheels at the rear 110 may steer the vehicle 102, and/or the two wheels at the front 108 and the two wheels at the rear 110 may simultaneously steer the vehicle 102 (i.e., four-wheel steering). Additionally, in four-wheel steering, the front two wheels and the rear two wheels may be controlled or actuated by varying amounts (or percentage) for steering the vehicle 102 along a route or during a particular maneuver. For example, to make a turn, the front wheels may be actuated by a first amount (or percentage) and the rear wheels may be actuated by a second amount (or percentage). In some instances, the vehicle 102 may include four-wheel steering capabilities, such as those described in U.S. patent application Ser. No. 16/917,431 titled "Trajectory Determination for Four-Wheel Steering,"

which is incorporated by reference herein in its entirety for all purposes or those described in U.S. Pat. No. 10,829,149 titled "Steering Control for Vehicles," which is incorporated herein by reference in its entirety for all purposes.

In some instances, the vehicle 102 may include a first suspension system located at the front 108 and a second suspension system located at the rear 110. The first suspension and the second suspension system may include various components, such as valve blocks, actuators, strut(s), fluid reservoirs, pump(s), accumulator(s), and so forth. In some instances, strut(s) of the first suspension system and the second suspension system may be actuated to similar or different lengths. Each of the strut(s) of the suspension system(s) may also be independently actuatable and extended to respective lengths. For example, the strut(s) at each wheel may be independently actuatable according to respective setting(s). In such instances, each of the strut(s) may have different travel heights and/or setting(s). The first suspension system and the second suspension system may also be actuated such that strut(s) on a first side 112 of the vehicle 102 may be extended to a first length and strut(s) on a first side 114 of the vehicle 102 may be extended to a second length that is less than the first length. With the setting(s) to the suspension system(s), the vehicle 102 may tailor combined roll and pitch to adjust experienced accelerations.

The drive mechanism(s) of the vehicle 102 may provide independent power to each of the wheels at the front 108 and the rear 110 for accelerating the vehicle 102 at different rates and/or moving the vehicle 102 at various speeds. In some instances, motor(s) operably coupled to the wheels at the front 108 and the rear 110 may power the wheels or accelerate the vehicle 102 at the same rate. In some instances, the vehicle 102 may be bi-directional and capable of traveling in multiple directions.

Turning to the flow diagram in FIG. 1, an operation 116 may include determining a location of the occupant 106 in the vehicle 102. As illustrated in FIG. 1 and as discussed above, sensor(s) may capture data (e.g., camera, weight sensor, etc.) within the interior of the vehicle 102 for knowing where the occupant 106 is seated. For example, the occupant 106 may be seated towards the rear 110, along the first side 114 (e.g., back right corner). In some instances, the location of the occupant 106 may also be used to determine whether the occupant 106 is forward facing or rearward facing, relative to the direction of travel.

An operation 118 may include identifying an activity associated with the occupant 106. For example, based on the data collected (e.g., image data), object detection, segmentation, and/or classification may be performed. The object detection, segmentation, and/or classification may identify item(s) and objects within the vehicle 102, held by the occupant 106, used by the occupant 106, and so forth. In the provided example, the identified activity may be reading and object segmentation may determine that the occupant 106 is reading a book.

An operation 120 may include determining a point of interest 122 associated with the occupant and/or the vehicle. The point of interest 122 may represent a point in coordinate space (e.g., X, Y, Z) about which to limit accelerations for optimizing ride comfort. This may include minimizing the magnitude and/or duration of acceleration experienced by the occupant 106. Given the different setting(s) of the steering, the suspension, and the drive mechanisms, as introduced above, the accelerations experienced by the occupant 106 may be limited, reduced, or mitigated of the point of interest. In some instances, depending on the different steering configurations and suspension configurations, the point of rotation of the vehicle 102 (or a body of the vehicle 102) may be adjusted. Positioning the point of rotation close, or in close proximity to the point of interest 122 may reduce accelerations experienced by the occupant 106.

In some instances, the point of rotation of the vehicle 102 may be represented along axes of the vehicle 102. For example, the vehicle 102 may include a lateral axis (X-axis), a longitudinal axis (Y-axis), and a vertical axis (Z-axis). These axes may be associated with pitch, roll, and yaw accelerations, respectively. The different setting(s) of the vehicle 102 may adjust or change the point of rotation along the lateral, longitudinal, and vertical axes. As such, by aligning or adjusting the point of rotation of the vehicle 102 closer to the point of interest 122, the accelerations experienced by the point of interest 122 may be reduced. In doing so the ride comfort may be optimized to a specific part of the vehicle 102 or occupant 106. For example, the ride comfort may be optimized for a particular occupant, a particular seating location within the vehicle 102, and/or a particular position relative to a particular occupant (e.g., hand or head of occupant).

In some instances, the point of interest 122 may be determined based on the activity and the location of the occupant. For example, if the occupant 106 is reading, the point of interest 122 may be chosen as a point associated with the reading material (e.g., book, magazine, etc.). As shown in FIG. 1, the point of interest 122 is shown positioned proximal to the lap of the occupant 106, or other location in which the reading material may be positioned. This may allow the occupant 106 to comfortably read the reading material without the reading material moving as the vehicle 102 moves. However, in some instances, the point of interest 122 may represent other portions of the vehicle 102 and the occupant 106. For example, the point of interest 122 may be associated with the head of the occupant 106 such that the head of the occupant 106 does not experience significant accelerations while the occupant 106 is reading. In some instances, this may impact a productivity of the occupant 106 reading, a comfort of the occupant 106, and so forth.

In some instances, the accelerations experienced by the point of interest 122 may be limited to within certain thresholds, limits, or ranges. For example, the point of interest 122 may be chosen for which to limit accelerations. If the accelerations are within certain ranges, the experienced accelerations may be acceptable. This may be used to make adjustment(s) or otherwise alter setting(s) of the vehicle 102. As part of this determination, sensor(s) (e.g., IMUs) may measure accelerations. The IMUs may also measure translational and rotational velocities and accelerations. Moreover, noted above, the ranges of the accelerations may be associated with the activity of the occupant 106. For example, the occupant 106 may be more susceptible to motions while reading, as compared to if the occupant 106 is looking out the window. In the latter instance, greater accelerations and motions may be acceptable because looking out the window may not require as great of focus or concentration than reading.

An operation 124 may include determining one or more setting(s) to the vehicle to increase occupant comfort. For example, to limit accelerations at the point of interest 122, the vehicle 102 may be adjusted according to certain setting(s) or configurations. In some instances, the adjustment(s) may include one or more setting(s) associated with steering, suspension, braking, and/or drive mechanism. As illustrated in the expanded view of FIG. 1, the adjustment(s) may change which wheels of the vehicle 102 steer and/or how the suspension system(s) of the vehicle 102 are adjusted. Additionally, or alternatively, the vehicle 102 may travel at slower speeds to reduce movement of the point of interest 122, or the occupant 106. For example, traveling at a slower speed around a corner may reduce motions (e.g., jerks) of the occupant 106.

The adjustment(s) may be determined prior to, or in advance, of maneuvers performed by the vehicle 102. For example, if the vehicle 102 is approaching a corner, the one or more adjustment(s) may be determined prior to the corner such that the vehicle 102 may institute the adjustment(s) for increasing the comfort of the occupant 106. The combination of which wheels are used to steer the vehicle 102, as well as the amount by which the wheel(s) steer the vehicle 102, may impact accelerations experienced by the point of interest 122. Moreover, the adjustment(s) may be modeled along the turns or while is vehicle 102 is cornering for making further adjustment(s) to increase ride comfort.

As shown in FIG. 1, the adjustment(s) may include turning the vehicle 102 with the four wheels. In some instances, to turn the vehicle 102, the front wheels may actuate to a certain steering angle or percentage (e.g., twenty percent, fifty percent, eighty percent, etc.) and the rear wheels may actuate to a certain steering angle or percentage (e.g., eight percent, fifty percent, twenty percent, etc.). The adjustment(s) to the steering may be made such that the experienced accelerations are within a certain threshold, satisfy tolerable limits, or satisfy the preference(s) of the occupant 106. Noted above, adjusting the steering may impact the roll accelerations experienced about the longitudinal axis.

Additionally, FIG. 1 illustrates that the one or more adjustment(s) may include actuating the second suspension system at the rear 110 of the vehicle 102 to lower than that of the first suspension system at the front 108 of the vehicle 102. For example, strut(s) of the second suspension system may be actuated to retract, while strut(s) of the first suspension system may be actuated to extend. In doing so, the center of rotation of the vehicle 102 may be adjusted (e.g., lowered) closer or aligned with the point of interest 122. As the vehicle 102 turns, maneuvers, goes over bumps, etc., the occupant 106 may experience reduced accelerations. In some instances, adjusting the suspension, between the front 108 and the rear 110, may impact pitch accelerations experienced about the lateral axis.

As also shown, the one or more adjustment(s) may include actuating strut(s) on the first side 112 to a first length and actuating strut(s) on the second side 114 to a second length. For example, strut(s) of the first suspension system and strut(s) of the second suspension system positioned along the first side 112 may be actuated to retract for reducing travel height along the first side 112. Strut(s) of the first suspension system and strut(s) of the second suspension system positioned along the first side 112 may be actuated to extend. As such, and as shown, the second side 114 may be at a higher elevation than the first side 112. In some instances, this actuation may counteract accelerations experienced at, or by, the point of interest 122 while turning around a corner. In some instances, adjusting the suspension, relative to the first side 112 and the second side 114, may impact yaw accelerations experienced about the vertical axis.

The velocity or acceleration of the drive mechanisms of the vehicle 102 may also be adjusted for reducing accelerations. For example, traveling at slower speeds around a corner may reduce roll, pitch, and/or yaw accelerations.

Although FIG. 1 illustrates particular adjustment(s), the vehicle 402 (or another communicatively coupled system) may iteratively determine acceleration(s) at the point of interest 122 given the different combinations of steering (e.g., four-wheel steering versus two-wheel steering), suspension, and speed, for example. For example, accelerations may be calculated or modeled for determining optimized setting(s) or adjustment(s) to make to the vehicle 402.

In some instances, the one or more adjustment(s) may be made or based on preference(s) of the occupant 106. For example, the occupant 106 may have certain or desired preference(s), such as acceptable speeds, routes, acceptable accelerations, acceptable braking, and so forth. These preference(s) may be factored into the adjustment(s) such that the vehicle 102 satisfies the preference(s) of the occupant 106. For example, if the occupant 106 is prone to motion sickness, the vehicle 102 may operate within certain parameters to reduce roll, pitch, and/or yaw accelerations. In some instances, the preference(s) may be determined via accessing a profile associated with the occupant 106, voice commands (e.g., "Please drive slow."), visual commands (e.g., gestures), and/or may be received via input provided to an interface within an interior of the vehicle.

Furthermore, the preference(s) of the occupant 106 may indicate other particularities, such as whether the occupant 106 preferences to be forward facing or rearward facing, relative to the direction of travel, whether the occupant 106 prefers to travel along routes with minimal cornering, hills, stops, etc., whether the occupant 106 prefers routes with speeds at certain limits, whether the occupant 106 prefers the vehicle 102 to have a certain climate (e.g., temperature, humidity, etc.), whether the occupant 106 prefers certain music, quite levels, or activities, and/or whether the occupant 106 prefers to travel alone. In some instances, the preference(s) may be utilized when determining the adjustment(s) to make to the vehicle 102 and/or when traveling along the route.

In some instances, the vehicle 102 may output indications associated with the adjustment(s). For example, as part of determining the adjustment(s), the vehicle 102 may output indications of action(s) that the vehicle 102 is to take for implementing the adjustment(s). By way of example, the vehicle 102 may output audio indicating that the suspension will be lowered to increase a comfort of the occupant 106. In some examples, the indication(s) output or a process for outputting the indications may be similar to those described in, for example, U.S. Pat. No. 10,372,130 titled "Communicating Reasons for Vehicle Actions," which is incorporated by reference herein in its entirety for all purposes.

Therein, adjustment(s) may be made as the vehicle 102 travels about the environment 100 in real time. Furthermore, as discussed herein, the vehicle 102 may include, or accommodate, more than one occupant. For example, multiple occupants may be seated in the vehicle 102 and respective activities of the occupants may be determined. These activities may be utilized to determine acceptable accelerations, respectively. Additionally, the point of interest 122 about which the vehicle 102 attempts to limit accelerations may be based on the location of the occupants and their associated activities, for example. Additional details of determining a point of interest about which to adjust setting(s) of the vehicle 402 with multiple occupants, or accommodating multiple occupants, are discussed herein.

Lastly, an operation 126 may performing a maneuver accord to the one or more setting(s). For example, after determining the setting(s), the vehicle 102 may implement the setting(s) and may therein travel along the route, or during a particular maneuver, with the setting(s). As the vehicle 102 travels about the environment 100 the route, the vehicle 102 may determine additional setting(s) or adjustment(s) to make to the vehicle 102 for increasing a comfort of the occupant 106, as shown by the loop from the operation 126 to the operation 116. In such instances, the occupant 106 may reposition, move seats, engage in different activities, and so forth. This may impact the adjustment(s) made to the vehicle 102.

Additionally, along the route, the vehicle 102 may also take mitigation action(s) based on explicit feedback or as otherwise determined. For example, as the vehicle 102 travels about the environment 100, the sensor(s) of the vehicle 102 may determine a complexion of the occupant 106. If the occupant 106 looks disturbed, uncomfortable, or sick, the vehicle 102 may make one or more adjustment(s). In some instances, the vehicle 102 may include sensor(s), such as IMUs for measuring accelerations experienced by the vehicle 102. The sensor(s) may measure the six degrees of freedom of the vehicle 102 (i.e., forward/backward, up/down, left/right, yaw, pitch, and roll). Additionally, or alternatively, the vehicle 102 may circulate air, adjust a climate, open windows, and/or draw blinds if the occupant 106 looks uncomfortable. Such feedback, however, may be provided by the user through voice commands, visual commands, or inputs to the user interface, as discussed above. For example, the vehicle 102 may include an interface for changing temperature, circulating air, opening windows, and so forth described in U.S. patent application Ser. No. 16/206, 967 titled "Actuation Interface," which is incorporated by reference herein in its entirety for all purposes.

Figure 2A:
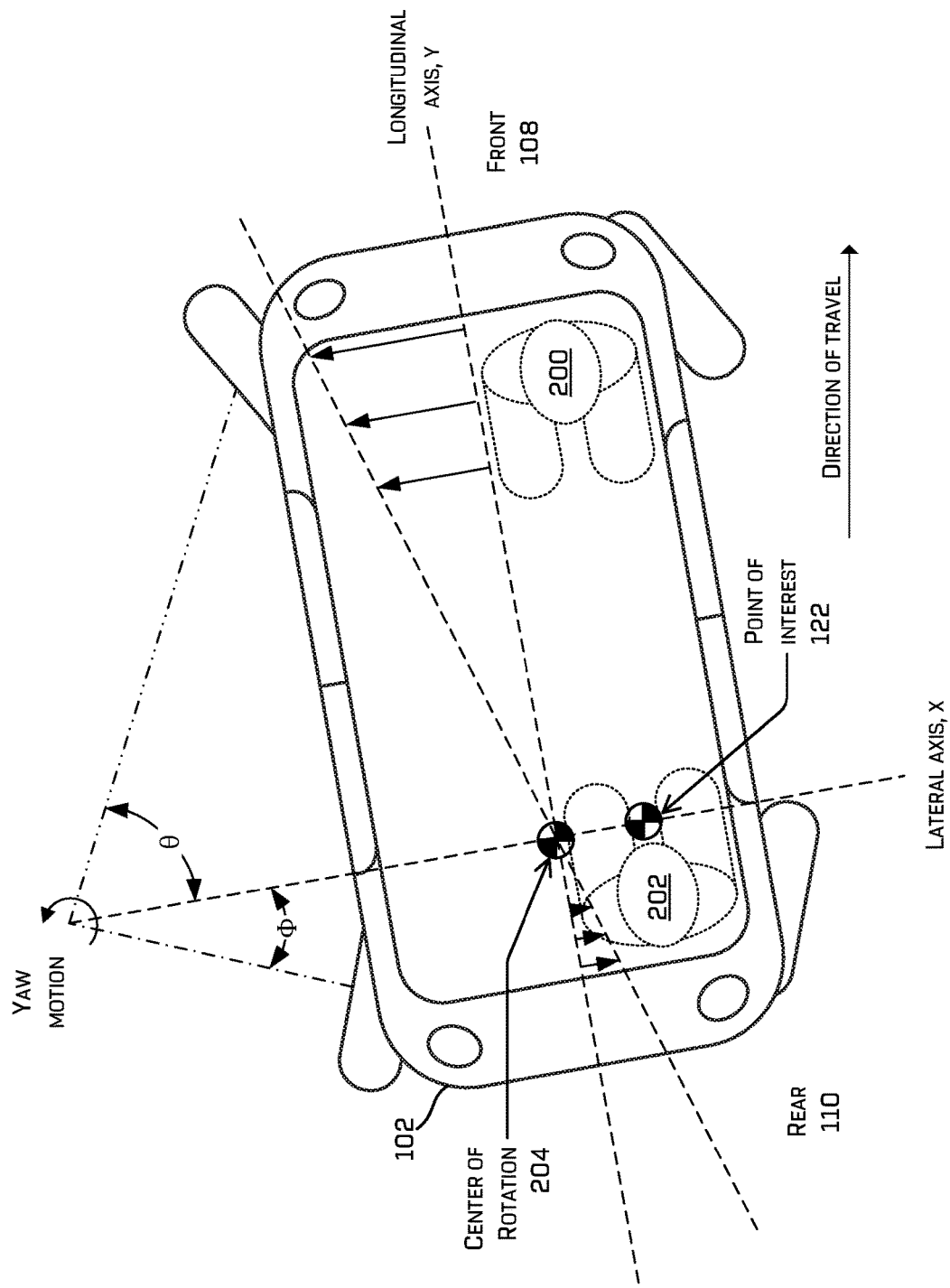
FIGS. 2A-2C illustrate various views of an example vehicle and making various example adjustment(s) to lateral or rotational accelerations of the vehicle.
Figure 2B:
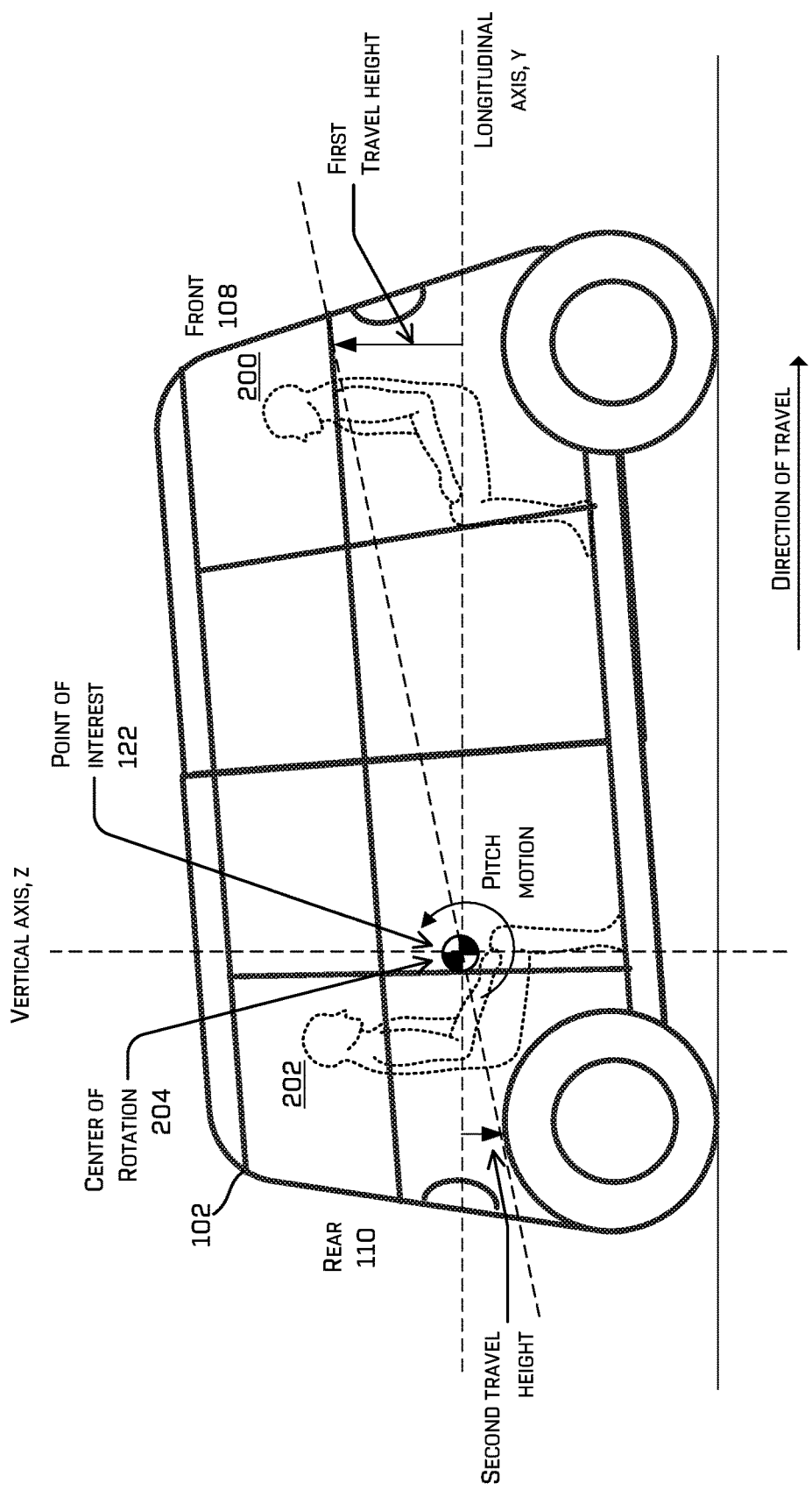
Figure 2C:
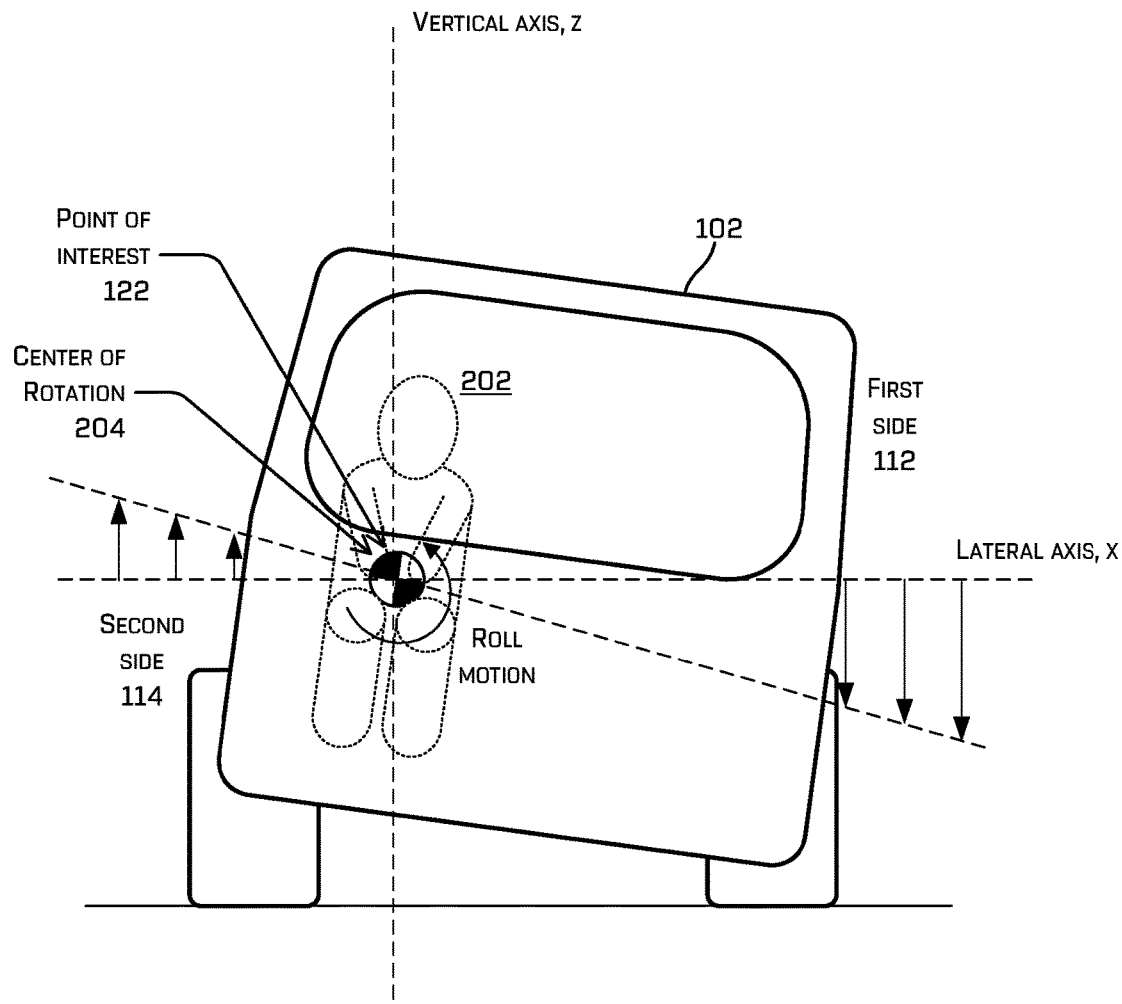

FIGS. 2A-2C illustrate various views showing accelerations experienced by occupants within the vehicle 102. FIGS. 2A-2C further illustrates adjustment(s) made to the vehicle 102 for increasing a comfort of the occupants. In relation to FIGS. 2A-2C, the vehicle 102 may include a first occupant 200 and a second occupant 200. The first occupant 200 may be rearward facing, relative to a direction of travel, and the second occupant 202 may be forward facing, relative to the direction of travel. Additionally, the first occupant 200 may be seated closer to the front 108 of the vehicle 102, as compared to the second occupant 202, who may be seated closer to the rear 110 of the vehicle 102.

In some instances, and as described above in relation to FIG. 1, the first occupant 200 and/or the second occupant 202 may be engaged in activities. For example, the first occupant 200 may be eating while the second occupant 202 may be reading. Based on these activities, adjustment(s) may be made to the vehicle 402. Moreover, the first occupant 200 and/or the second occupant may have different susceptibilities to motion sickness, or difference sensitivities to motion. For example, as it pertains to FIGS. 2A-2C, the second occupant 202 may experience motion sickness, while the first occupant 200 may not or may have a greater tolerance to accelerations. In some instances, the susceptibility to motion sickness may be determined via accessing profiles associated with the first occupant 200 and/or the second occupant 202, and/or the first occupant 200 and/or the second occupant 202 may provide indications of such. Given the activity of the second occupant 202 and/or the sensitivity to motion sickness of the second occupant 202, a center of rotation 204 of the vehicle is shown being closely located to the second occupant 202. In effect, this may reduce the accelerations experienced by the second occupant 202. The position of the center of rotation 204 may also be determined in coordinate space, along one or more axes, relative to the vehicle 402.

FIG. 2A illustrates a top plan view of the vehicle 102. As shown, the center of rotation 204 and the point of interest 122 may be both be aligned along the lateral axis. Moreover, the center of rotation 204 may be placed along the longitudinal axis in close proximity to the point of interest 122. By positioning the center of rotation 204 close to the second occupant 202, FIG. 2A illustrates that yaw accelerations experienced by the first occupant 200 may be greater than those experienced by the second occupant 202. In doing so, the comfort of the second occupant 202 may be increased and/or the second occupant 202 may not experience motion sickness, or may have decreased sensitivities to motion sickness.

Additionally, FIG. 2A illustrates that a steering angle of the wheels at the front 108 may be greater than a steering angle of the wheels at the rear 110. For example, the wheels at the front 108 may have a steering angle of θ and the wheels at the rear 110 may have a steering angle of Φ, where θ may be greater than Φ. The steering angles, respectively, may be adjusted such that the center of rotation 204 may be as close as possible to the point of interest 122. That is, along the lateral axis, the center of rotation 204 may be as close as possible to the point of interest 122.

FIG. 2B illustrates a longitudinal plan view of the vehicle 102. As shown, the center of rotation 204 and the point of interest 122 coincide or both be located along or aligned on the lateral axis. Moreover, the center of rotation 204 and the point of interest 122 may be aligned along the vertical axis. By positioning the center of rotation 204 close to the second occupant 202, along the lateral axis and/or the vertical axis, FIG. 2A illustrates that pitch accelerations experienced by the first occupant 200 may be greater than those experienced by the second occupant 202. More particularly, FIG. 2B illustrates that the first suspension system at the front 108 of the vehicle 102 may be actuated to a first length and the second suspension system at the rear 110 of the vehicle may be actuated to a second length that is less than the first length. As such, the suspension systems of the vehicle 102 may be independently actuated while going over uneven surfaces, for example, such that the center of rotation 204 is as close as possible to the point of interest 122 (in x- and z-directions). FIG. 2B further illustrates that as part of adjusting the first suspension system and the second suspension system, the first suspension system may have a first travel height and the second suspension system may have a second travel height that is less than the first travel height. As such, the pitch accelerations experienced by the second occupant 202 may be less than those experienced by the first occupant 200.

FIG. 2C illustrates a front plan view of the vehicle 102. In FIG. 2C the first occupant 200 is shown omitted in order to illustrate the second occupant 202. As shown in FIG. 2C, the strut(s) of the first suspension system and the strut(s) of the second suspension system on the first side 112 may be extended by a first length that is less than a second length of the strut(s) of the first suspension system and the strut(s) of the second suspension system on the second side 114. The strut(s) of the first suspension system and the second suspension system may be independently actuated while going over uneven surfaces or while traveling around corners. In doing so, the center of rotation 204 may be positioned as close as possible to the point of interest 122. As such, the roll accelerations experienced by the second occupant 202 may be less than those experienced by the first occupant 200.

Moreover, the travel height of the strut(s) of the first suspension system and the second suspension system along the first side 112 may be greater than the travel height of the strut(s) of the first suspension system and the second suspension system along the second side 114.

Figure 3:
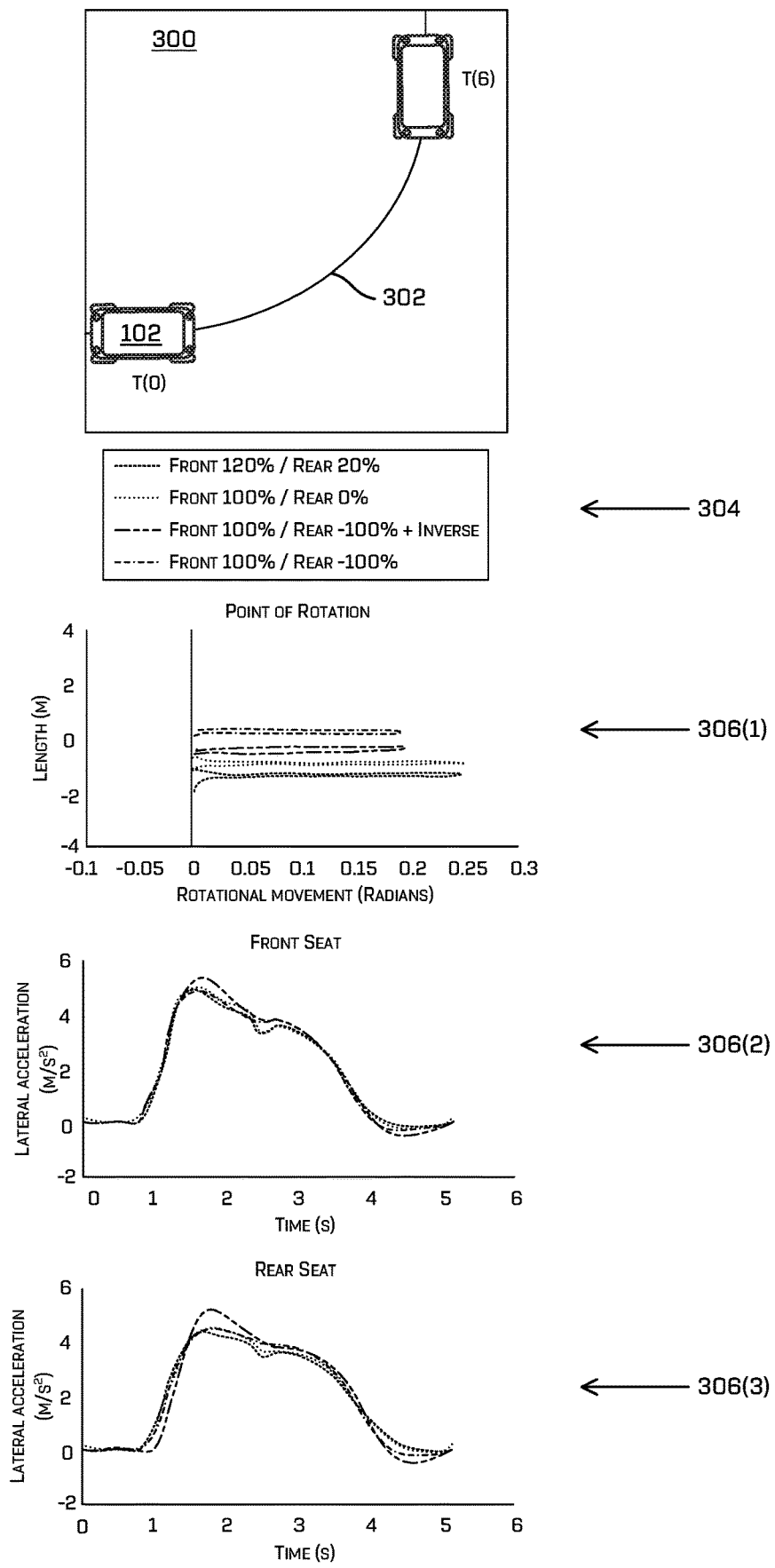
FIG. 3 illustrates various graphs showing example accelerations and motions of a vehicle resulting from different steering setting(s).

FIG. 3 illustrates different steering settings (e.g., profile, model, etc.) for a vehicle 102 traveling around a corner. For example, a diagram 300 is shown in which the vehicle 102 travels around a ninety-degree corner 302. In some instances, the different steering settings about which the vehicle 102 travels around the corner 302 may cause different lateral accelerations experienced by occupants.

A key 304 is shown that illustrates different steering settings of the vehicle 102. In some instances, the different steering settings may be represented by an amount of steering, in percentage, of the front wheels versus the rear wheels. For example, a first steering setting may include, or represent, an instance where the vehicle 102 only includes front wheel steering and no rear wheel steering (i.e., front 100%/rear 0%). A second steering setting may include, or represent, an instance where the front wheels and the rear wheels have the same steering angle, but the rear wheels steer at an opposite steering angle (i.e., front 100%/rear −100%). A third steering setting may include, or represent, and instance where the front wheels includes a greater steering angle as compared to the back wheels of the vehicle (i.e., front 120%/rear 20%). A fourth steering setting may include, or represent, an instance where the vehicle 102 attempts to keep a center of the vehicle following a tangent of the path or route that the vehicle 102 is following.

The progression of the vehicle 102 throughout the turn, or along the route, may be modeled between a first instance in time (t(o)) and a second instance in time (t(6)). At the first instance in time, the vehicle 102 may be approaching the corner 302 while at the second instance in time the vehicle 102 may be exiting the corner 302. A first graph 306(1) illustrates an amount of motion or movement experienced by various longitudinal positions within the vehicle 102, along a length of the vehicle 102. For example, the length (m) may represent a length of the vehicle 102, where zero (0) represent a center of the vehicle 102 along the longitudinal axis. As shown, the different steering setting may induce or cause different rotational movements, as shown along the X-axis of the first graph 306(1).

A second graph 306(2) illustrates the amount of lateral accelerations (Y-axis) as a function of time (Y-axis) for front seats of the vehicle 102. A third graph 306(3) illustrates the same, but for rear seats of the vehicle 102. As shown in the second graph 306(2) and the third graph 306(3), some steering setting(s) may cause peaks or valleys in lateral accelerations. In some instances, these may be experienced as jerks in acceleration and cause discomfort to the occupants.

Based on the modeling, and the determined rotational movement and the lateral accelerations, a steering setting that minimizes the acceleration for a particular seating position of interest may be chosen. Additionally, a steering setting that minimizes acceleration may be chosen for a seat or point of interest. That is, prior to selecting a steering setting, the different steering setting or configuration may be modeled or calculated for selecting steering profile that minimizes accelerations. This may include minimizing the magnitude of acceleration, the duration that the vehicle 102 is accelerating, or both the magnitude and duration of the acceleration. However, the graphs 306(1)-(3) shown illustrate one degree of freedom (i.e., steering). By combining other degrees of freedom, such as suspension configurations and/or speed, different accelerations may be experienced. That is, suspension system(s) and/or drive mechanism(s) may similarly be modeled for determining setting(s) of the vehicle 102 that limit accelerations for a particular point of interest. Additionally, braking system(s) may be modeled for determining an amount of braking to apply to the vehicle 102.

Figure 4:
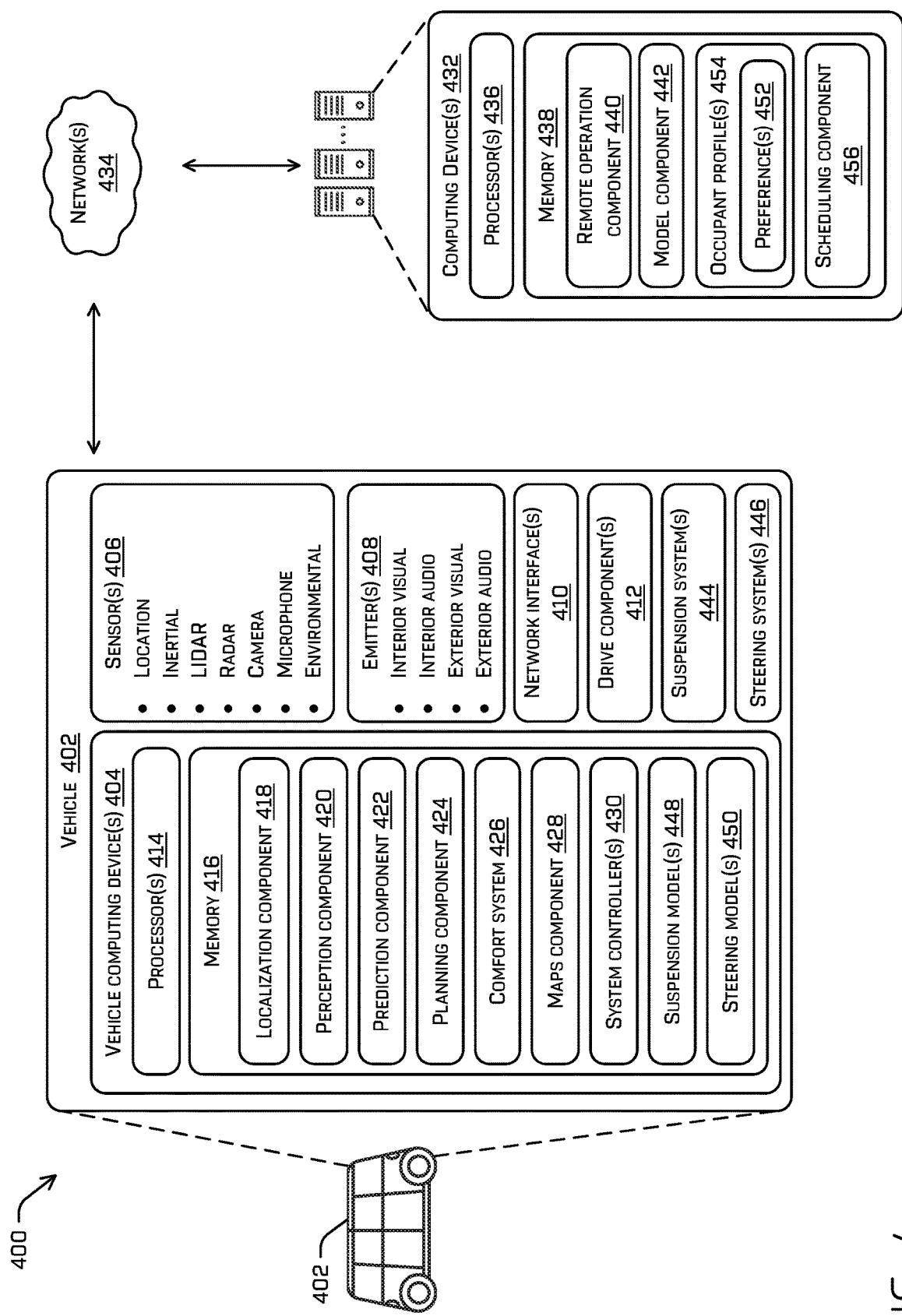
FIG. 4 illustrates a block diagram of an example system for implementing the techniques described herein.

FIG. 4 illustrates a block diagram of an example system 400 that implements the techniques discussed herein. In some instances, the example system 400 may include a vehicle 402, which may represent the vehicle 102 in FIGS. 1, 2A-2C, and 3. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well.

The vehicle 402 may include one or more vehicle computing device(s) 404, one or more sensor(s) 406, one or more emitter(s) 408, one or more network interface(s) 410 (also referred to as communication devices and/or modems), one or more drive component(s) 412, one or more suspension system(s) 444, and/or one or more steering system(s) 446. In some instances, the one or more sensor(s) 406 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor(s) 406 may include multiple instances of each of these or other types of sensors. For instance, the time-of-flight sensors may include individual time-of-flight sensors located at the corners, front, back, sides, and/or top of the vehicle 402. As another example, the camera sensors may include multiple cameras disposed at various locations about the exterior and/or interior of the vehicle 402 (e.g., ceiling, headrest(s), etc.). The one or more sensor(s) 406 may provide input to the vehicle computing device(s) 404.

The one or more emitter(s) 408 may emit light and/or sound. The one or more emitter(s) 408 in this example may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 may also include one or more network interface(s) 410 that enable communication between the vehicle 402 and one or more other local or remote computing device(s) (e.g., a remote teleoperation computing device) or remote services. For instance, the one or more network interface(s) 410 may facilitate communication with other local computing device(s) on the vehicle 402. Also, the one or more network interface(s) 410 may allow the vehicle 402 to communicate with other nearby computing device(s) (e.g., other nearby vehicles, traffic signals, etc.). The one or more network interface(s) 410 may include physical and/or logical interfaces for connecting the vehicle computing device(s) 404 to another computing device or one or more external networks (e.g., the Internet). For example, the one or more network interface(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 4G, etc.), satellite communication, dedicated short range communications (DSRC), or any suitable wired or wireless communications protocol that enables the respective computing device to interface with the other computing device(s).

In at least one example, the vehicle 402 may include one or more drive component(s) 412. In some examples, the vehicle 402 may have a single drive component 412. In at least one example, the vehicle 402 may have multiple drive components 412, where individual drive components 412 may be positioned on opposite ends of the vehicle 402 (e.g., the front and the rear, etc.). In at least one example, the drive component(s) 412 may include the one or more sensor(s) 406 to detect conditions of the drive component(s) 412 and/or the surroundings of the vehicle 402. By way of example and not limitation, the sensor(s) 406 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensor(s), such as the wheel encoders may be unique to the drive component(s) 412. In some cases, the sensor(s) 406 on the drive component(s) 412 may overlap or supplement corresponding systems of the vehicle 402 (e.g., sensor(s) 406).

The drive component(s) 412 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 412 may include a drive system controller which may receive and preprocess data from the sensor(s) 406 and to control operation of the various system(s) and/or component(s) of the vehicle 402. In some examples, the drive system controller may include one or more processor(s) and memory communicatively coupled with the one or more processor(s). The memory may store one or more components to perform various functionalities of the drive component(s) 412. Furthermore, the drive component(s) 412 also include one or more communication connection(s) that enable communication by the respective drive system with one or more other local or remote computing device(s).

The one or more suspension system(s) 444 may absorb dumps, vibrations, motions, and/or accelerations experienced by the vehicle 402 and for controlling the vehicle 402. In some instances, the one or more suspension system(s) 444 may include a first suspension system located at a front (or first end) of the vehicle 402 and a second suspension system located at a rear (or second end) of the vehicle 402. The suspension system(s) 444 may, in some instances, respectively include spring(s), strut(s), actuator(s), valve block(s), pump(s), hydraulic line(s), accumulator(s), and so forth for providing suspension to the vehicle 402. In some instances, each of the suspension system(s) 444 may be independently actuatable and component(s) within each of the suspension system(s) 444 may be independent actuatable. For example, strut(s) of the first suspension system and/or the second suspension system may be independently actuated to various length to adjust a position (e.g., yaw, pitch, roll) of the vehicle 402 or at least a position of the vehicle 402. This, in some instances, may affect combined roll and pitch accelerations experienced by the occupant(s). As discussed herein, the suspension system(s) 444 may be controlled and actuated to reduce accelerations experienced by occupant(s) of the vehicle 402. For example, actuating strut(s) of the suspension system(s) 444 to different lengths may change travel heights of the portions of the vehicle 402. The differing travel heights may affect rotational or lateral accelerations.

The one or more steering system(s) 446 may control a steering of the vehicle 402. The steering system(s) 446 may include pump(s), hydraulic line(s), control valve(s), tie rod(s), shaft(s), wheels, hubs, axles, and so forth for steering the vehicle 402 throughout an environment, along a route, or during a maneuver. In some instances, the steering system(s) 446 may steer front or leading wheels of the vehicle 402 and/or rear or trailing wheels of the vehicle 402. In some instances, the vehicle 402 may steer using both the front wheels and/or the back wheels. For example, the vehicle may include four-wheel steering and the front wheels may be independently steerable of the rear wheels, and vice versa. The front wheels and the rear wheels may also steer at different steering angles or by different percentages.

As shown, the vehicle computing device(s) 404 may include one or more processor(s) 414 and memory 416 communicatively coupled with the one or more processor(s) 414. In the illustrated example, the memory 416 of the vehicle computing device(s) 404 stores a localization component 418, a perception component 420, a prediction component 422, a planning component 424, a comfort system 426, a map component 428, one or more system controller(s) 430, steering model(s) 448, and suspension model(s) 450. Though depicted as residing in the memory 416 for illustrative purposes, it is contemplated that the localization component 418, the perception component 420, the prediction component 422, the planning component 424, the comfort system 426, the map component 428, the one or more system controller(s) 430, the steering model(s) 448, and the suspension model(s) 450 may additionally, or alternatively, be accessible to the vehicle computing device(s) 404 (e.g., stored in a different component of vehicle 402) and/or be accessible to the vehicle 402 (e.g., stored remotely).

In the memory 416 of the vehicle computing device(s) 404, the localization component 418 may include functionality to receive data from the sensor(s) 406 to determine a position of the vehicle 402. For example, the localization component 418 may include and/or request/receive a three-dimensional map of an environment and may continuously determine a location of the autonomous vehicle within the map. In some instances, the localization component 418 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 418 may provide data to various components of the vehicle 402 to determine an initial position of the vehicle 402 for generating a trajectory, as discussed herein.

The perception component 420 may include functionality to perform object detection, segmentation, and/or classification. In some examples, the perception component 420 may provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In some instances, the perception component 420 may include functionality to store perception data generated by the perception component 420. In some instances, the perception component 420 may determine a track corresponding to an object that has been classified as an object type. The stored perception data may, in some examples, include fused perception data captured by the vehicle 402. Fused perception data may include a fusion or other combination of sensor data from sensor(s) 406, such as image sensors, lidar sensors, radar sensors, time of flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.).

In additional and/or alternative examples, the perception component 420 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 420 may use perception algorithms to determine a perception based bounding box associated with an object in the environment based on sensor data. For example, the perception component 420 may receive image data from the one or more sensor(s) 406 and classify the image data to determine that an object is represented in the image data. Then, using detection algorithms, the perception component 420 may generate a two dimensional bounding box and/or a perception based three dimensional bounding box associated with the object. The perception component 420 may further generate a three dimensional bounding box associated with the object. The three dimensional bounding box may provide additional information such as a location, orientation, pose, and/or size (e.g., size, width, height, etc.) associated with the object.

The prediction component 422 may generate one or more probability maps representing prediction probabilities of possible locations of one or more objects in an environment. For example, the prediction component 422 may generate one or more probability maps for vehicles, pedestrians, animals, and the like within a threshold distance from the vehicle 402. In some instances, the prediction component 422 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planning component 424 may determine a path for the vehicle 402 to follow to traverse through an environment. For example, the planning component 424 may determine various routes and paths and various levels of detail. In some instances, the planning component 424 may determine a route to travel from a first location (e.g., a current location) to a second location (e.g., a target location). For the purpose of this discussion, a route may be a sequence of waypoints for traveling between two locations. As non-limiting examples, waypoints include streets, intersections, GPS coordinates, etc. Further, the planning component 424 may generate an instruction for guiding the vehicle 402 along at least a portion of the route from the first location to the second location. In at least one example, the planning component 424 may determine how to guide the vehicle 402 from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 424 may alternatively, or additionally, use data from the perception component 420 and/or the prediction component 422 to determine a path for the vehicle 402 to follow to traverse through an environment. For example, the planning component 424 may receive data from the perception component 420 and/or the prediction component 422 regarding objects associated with an environment. Using this data, the planning component 424 may determine a route to travel from a first location (e.g., a current location) to a second location (e.g., a target location) to avoid objects in an environment. In at least some examples, such a planning component 424 may determine there is no such collision free path and, in turn, provide a path which brings vehicle 402 to a safe stop avoiding all collisions and/or otherwise mitigating damage.

The comfort system 426 may determine different adjustment(s) or setting(s) of the drive component(s) 412, the suspension system(s) 444, and/or the steering system(s) 446 to accommodate the occupant(s). For example, the comfort system 426 may determine sensitivities of the occupant(s) and make adjustment(s) to the drive component(s) 412, the suspension system(s) 444, and/or the steering system(s) 446 to accommodate the sensitivities. For example, if the occupant(s) is/are prone to motion sickness, the comfort system 426 may make adjustment(s) to the drive component(s) 412, the suspension system(s) 444, and/or the steering system(s) 446. By way of example, the comfort system 426 may adjust a speed of the vehicle 402, may actuate the suspension system(s) 444 to different travel heights, and/or may change steering configurations of the steering system(s) 446, such as two-wheel steering versus four-wheel steering. Setting(s) of a braking system(s) may also be adjusted.

In some instances, the comfort system 426 may utilize suspension model(s) 448 and/or steering model(s) 450 for calculating perceived accelerations. The suspension model(s) 448 may include different adjustment(s), setting(s), or configuration(s) of the suspension system(s) 444. For example, the suspension model(s) 448 may indicate an extended length or travel height of individual strut(s) of the suspension system(s) 444. Different suspension model(s) 448 may affect accelerations of the occupant(s). The steering model(s) 450 may include different adjustment(s), setting(s), or configuration(s) of the steering system(s) 446. For example, the steering model(s) 450 may indicate an amount or percentage of steering of the front wheels and/or the rear wheels of the vehicle 402.

Utilizing the suspension model(s) 448 and the steering model(s) 450, the comfort system 426 may determine accelerations experienced by the occupant(s), or a point of interest within the vehicle 402, or projections accelerations. For examples, each of the suspension model(s) 448 and/or the steering model(s) 450 may be associated with a different point of rotation on the vehicle 402. That is, by adjusting the suspension and/or the steering configurations, the point of rotation of the vehicle 402 may be adjusted. As such, changing the suspension and/or steering setting(s) of the vehicle 402 may affect accelerations experienced by the occupant(s). The comfort system 426 may also determine the accelerations based on a route of the vehicle 402 (e.g., turns). In such instances, the maneuvers along the route may affect the accelerations.

The comfort system 426 may generate or cause instructions or commands to be transmitted to the suspension system(s) 444 and the steering system(s) 446. For example, the comfort system 426 may transmit an instruction for the steering system(s) 446 to steer the wheel(s) at certain angles, amounts, or percentages. As part of this instruction, the comfort system may receive sensor data from the sensor(s) 406 for knowing how to adjust the suspension, steering, and/or speed.

In some instances, the comfort system 426 may also determine adjustment(s) based on determined activities of the occupant(s) and/or locations of the occupant(s) within the vehicle. For example, the sensor(s) 406 may capture image(s) within an interior of the vehicle 402 for use in object detection and determining activities of the occupant(s). Based on the activities of the occupant(s), the comfort system 426 may make adjustment(s) for increasing a comfort of the occupant(s) and the activity the occupant(s) are engaged in. Additionally, the adjustment(s) may be made according to a position or location of the occupant(s) in the vehicle. In some instances, the adjustment(s) may be made such that the experienced accelerations are within acceptable ranges and/or thresholds. For example, certain occupant(s) may be more susceptible to accelerations as compared to other occupant(s). Additionally, certain activities may be more susceptible to accelerations and movement (e.g., reading), as compared to others (e.g., listening to music).

In some instances, additionally or alternatively, the comfort system 426 may make adjustment(s) according to preference(s) 452 associated with occupant profile(s) 454. For example, the occupant profile(s) 454 may indicate suitable levels or threshold accelerations. The occupant profile(s) 454 may also indicate sensitivities to motion (e.g., sensitive or not, a level or degree of sensitivity, such as 7/10 on a motion sensitivity scale, etc.). The preference(s) 452 may be utilized by the comfort system 426 for selecting setting(s) of the suspension system(s) 444 and/or the steering system(s) 446, as well as other system(s), such as a speed of the vehicle 402. Moreover, the preference(s) 452 may also indicate a preferred seating location within the vehicle 402 (e.g., rearward facing or forward facing), whether the occupant prefers a route with less stops, hills, or turns, whether the occupant prefers slower routes or faster routes, music preference(s), climate settings (e.g., temperature), whether the occupant prefers to talk during the route, and so forth. Based on these preference(s) 452, the comfort system 426 may coordinate with other system(s) of the vehicle 402 to increase a comfort of the occupant(s). In some instances, the comfort system 426 may perform action(s) for carrying out the preference(s) 452. Additionally, the comfort system 426 may receive feedback from the occupant(s) for adjusting the setting(s) of the vehicle 402. In some instances, preference(s) 452 within the occupant profile(s) 454 may be determined based in explicit input from the occupant and/or learned preferences based inputs during (e.g., commands or simply comments, gestures, and body language during the ride) and/or after the ride with the feedback (e.g., reviews and feedback).

The memory 416 may further include one or more map component(s) 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more map component 428 may include at least one map (e.g., images and/or a mesh). In some examples, the vehicle 402 may be controlled based at least in part on the map component 428. That is, the map component 428 may be used in connection with the localization component 418, the perception component 420 (and sub-components), the prediction component 422, and/or the planning component 424 to determine a location of the vehicle 402, identify objects in an environment, generate prediction probability(ies) associated with objects and/or the vehicle 402, and/or generate routes and/or trajectories to navigate within an environment.

In at least one example, the vehicle computing device(s) 404 may include one or more system controller(s) 430, which may be configured to control steering, propulsion, braking, safety, emitters, communication, and other systems of the vehicle 402. These system controller(s) 430 may communicate with and/or control corresponding systems of the drive component(s) 412 and/or other components of the vehicle 402, which may be configured to operate in accordance with a path provided from the planning component 424.

The vehicle 402 may connect to computing device(s) 432 via a network 434 and may include one or more processor(s) 436 and memory 438 communicatively coupled with the one or more processor(s) 436. In at least one instance, the one or more processor(s) 436 may be similar to the processor(s) 414 and the memory 438 may be similar to the memory 416. In the illustrated example, the memory 438 of the computing device(s) 432 stores a remote operation component 440 and/or a model component 442. In at least one instance, the model component 442, after empirical testing and/or simulations, may generate ML models to be used by the perception component 420, as discussed herein. Though depicted as residing in the memory 438 for illustrative purposes, it is contemplated that the remote operation component 440 and the model component 442 may additionally, or alternatively, be accessible to the computing device(s) 432 (e.g., stored in a different component of computing device(s) 432 and/or be accessible to the computing device(s) 432 (e.g., stored remotely). The model component 442 may include functionality to generate models for determining heights/classifications of multi-channel image data, as discussed herein.

As shown, the computing device(s) 432 may store the occupant profile(s) 454 having the preference(s) 452. In some instances, the computing device(s) 432 may transmit the preference(s) 452 to the vehicle 402 for being instituted at the vehicle 402 and increasing a comfort of the occupant(s). Additionally, in some instances, the occupant(s) may update the occupant profile(s) 454 by providing feedback, reviews, and so forth. For example, the occupant(s) may indicate within the occupant profile 454 that they are sensitive to motion sickness, prefer routes with minimal turns, climate conditions, and so forth. Additionally, the occupant(s) may submit reviews following a ride in the vehicle 402 and based on the reviews, the computing device(s) 432 may determine updated preference(s) 452 of the occupant(s).

The computing device(s) 432 is further shown including a scheduling component 456. In some instances, the scheduling component 456 may schedule vehicles, such as the vehicle 402, to occupants. For example, the vehicle 402 may be used for ride sharing or assigning the vehicle 402 to drive multiple occupants. In some instances, the scheduling component 456 may group similar occupant(s) into the vehicle 402 based on their respective preference(s) 452. For example, if two occupants experience motion sickness, the two occupants may be assigned to a common vehicle and the vehicle may travel at slower speeds and avoid a route with excessive turns, for example. Alternatively, if one occupant experiences motion sickness and other occupant does not, the scheduling component 456 may assign the occupants to two different vehicles. In some instances, the scheduling component 456 may determine similarities or differences between the preference(s) 452 for use in determining whether the occupant(s) should be grouped in a similar vehicle.

Moreover, the scheduling component 456 may manage a fleet of vehicles for assigning or scheduling rides for occupant(s). In such instances, the scheduling component may receive requests associated with scheduling a ride, determining locations associated with the ride, access the occupant profiles 454 and/or the preferences, and so forth for determining which vehicle to schedule for the ride and/or which occupant(s) to schedule for a ride, and dispatching the vehicle to pick up the occupants. The scheduling component 456 may also select or schedule a vehicle that is able to optimize the ride comfort based on positions of multiple occupant(s) within the vehicle 402.

The processor(s) 414 of the vehicle computing device(s) 404 and the processor(s) 436 of the computing device(s) 432 may be any suitable processor capable of executing instructions to process data and perform operations as described herein. By way of example and not limitation, the processor(s) 414 and 436 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 416 vehicle computing device(s) 404 and the memory 438 of the computing device(s) 432 are examples of non-transitory computer-readable media. The memory 416 and 438 may store an operating system and one or more software applications, instructions, programs, and/or data to implement the methods described herein and the functions attributed to the various systems. In various implementations, the memory 416 and 438 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 416 and 438 may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

FIGS. 5-8 illustrate various processes related to making adjustment(s) to a vehicle accommodate occupant(s). The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2A-2C, 3, and 4, although the processes may be implemented in a wide variety of other environments, architectures and systems.

Figure 5:
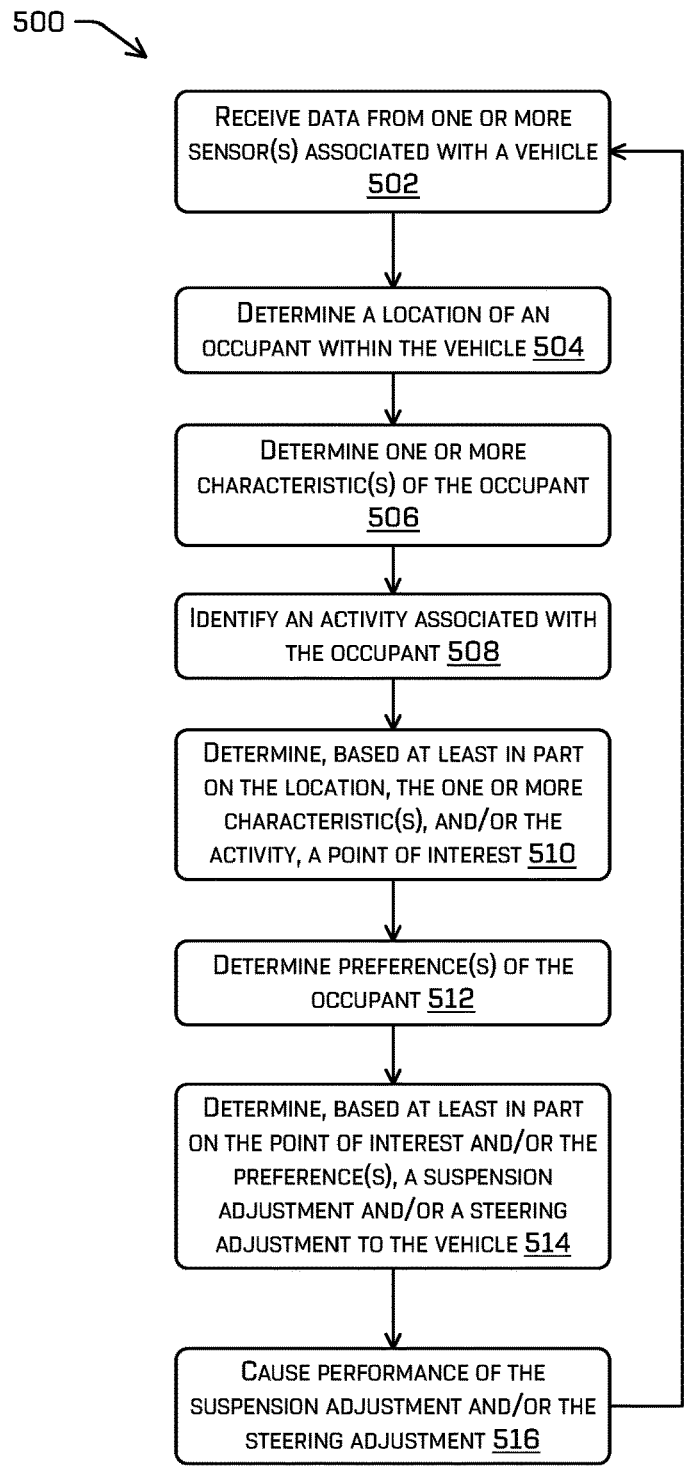
FIG. 5 illustrates an example process for adjusting steering and/or suspension setting(s) of a vehicle to increase a comfort of an occupant within the vehicle.
Figure 6:
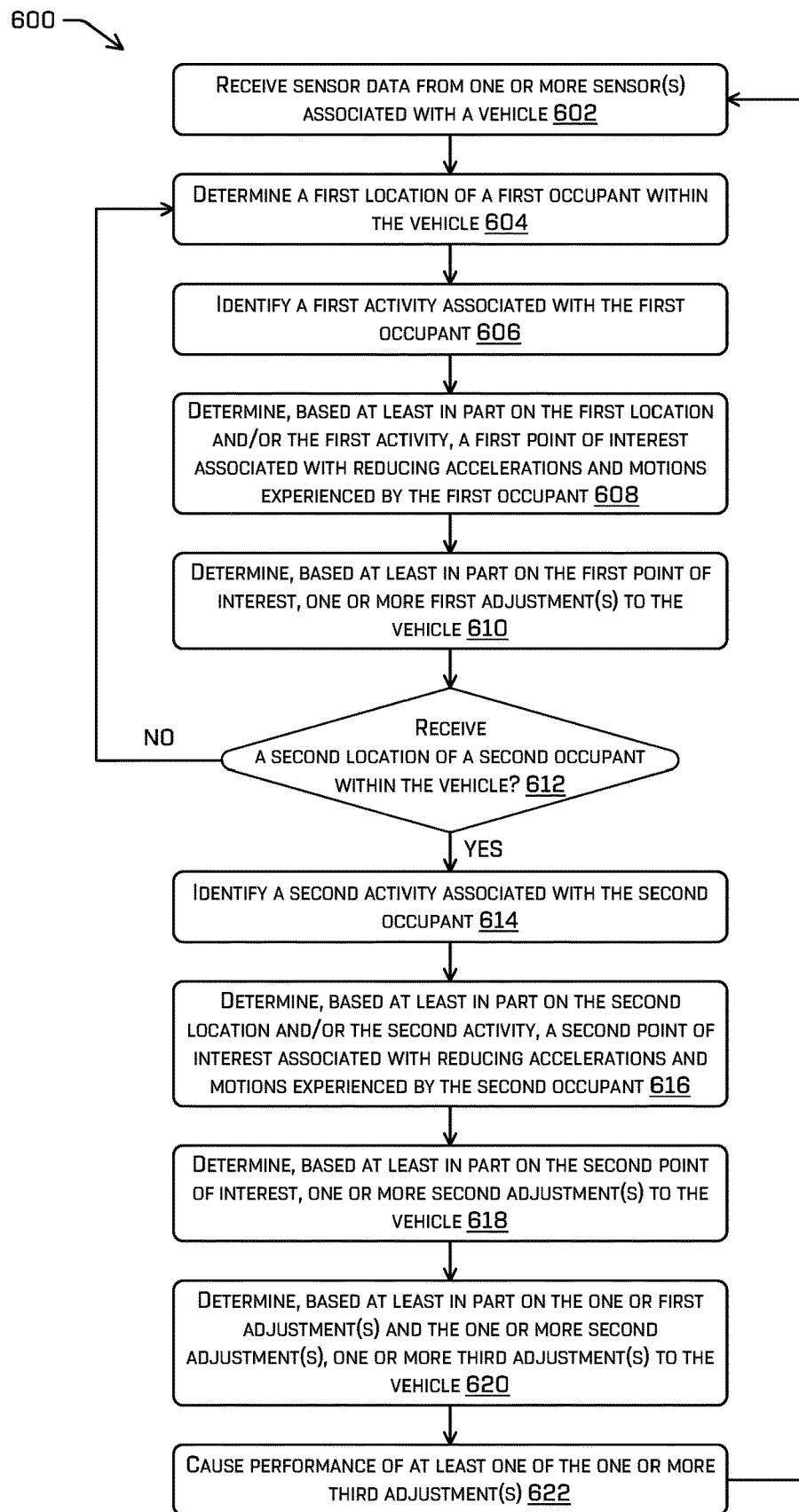
FIG. 6 illustrates an example process for adjusting steering and/or suspension setting(s) of a vehicle to increase a comfort of multiple occupants in the vehicle.

FIG. 5 illustrates a process for making adjustment(s) to the vehicle 402 for optimizing a comfort of an occupant within the vehicle 402.

At 502, the process 500 may include receiving data from one or more sensor(s) associated with the vehicle. For example, the sensor(s) may include camera(s) that are disposed within an interior of the vehicle 402. Image data captured by the camera(s) may be used for determining a seat occupied by the occupant. Additionally, as discussed herein, the image data may be used for determining characteristic(s) of the occupant, such as height, and/or an activity (or activities) of the occupant. However, the sensor(s) may, additionally or alternatively, include weight sensor(s) disposed in seat(s) of the vehicle 402, a sensor associated with a seatbelt, or other sensor for knowing whether the occupant is seated, which of multiple seats the occupant is in, a position of the occupant within the seat, a size of the occupant, and/or other information.

At 504, the process 500 may include determining a location of an occupant within the vehicle. For example, based at least in part on the data received at 502, the process 500 may determine which of multiple seats the occupant is seated in. Determining which seat the occupant is seated within may also include a determination of whether the occupant is rearward facing or forward facing, relative to a direction of travel of the vehicle 402. As such, knowing which seat the occupant is seated in may be used to determine a location of the occupant within the vehicle 402.

At 506, the process 500 may include determining one or more characteristic(s) of the occupant. For example, based at least in part on the data received at 502, the process 500 may determine a weight of the occupant, a height of the occupant, a posture of the occupant, and so forth. By way of example, a weight sensor disposed in the seat may indicate a weight of the occupant and image data captured by a camera of the vehicle 402 may indicate a height of the occupant. In some instances, the characteristic(s) may also correspond to other physical characteristic(s) of the occupant, such as complexion, perspiration, eye gaze, etc. Additionally, the characteristic(s) may also correspond to an identity associated with the occupant. In some instances, the identity may be determined based on the occupant scheduling a ride with the vehicle, an indication received from a mobile device of the occupant, biometric sensors, etc.

At 508, the process 500 may include determining an activity of the occupant. For example, image data captured by the camera(s) may be analyzed to determine whether the occupant is engaged in an activity, such as accessing a laptop, engaging with a mobile device (e.g., phone, tablet, etc.), reading, eating/drinking, sleeping, talking with other occupant(s), etc. In some instances, determining the activity of occupant may also be based on other data received by the vehicle 402 or systems of the vehicle 402. For example, a mobile device of the occupant may communicatively couple to system(s) of the vehicle 402. In some instances, the communicative coupling of the mobile device may indicate the activity of the occupant. Additionally, or alternatively, the activity may be determined via inputs to a user interface within the vehicle 402, voice commands provided by the occupant, and/or gestures provided by the occupant.

At 510, the process 500 may include determining, based at least in part on the location, the one or more characteristic(s), and/or the activity, a point of interest. In some instances, the point of interest may be associated with the occupant and/or the vehicle 402 about which to optimize ride comfort. For example, the point of interest may be associated with a CoG of the occupant, lap of the occupant, or a head of the occupant. Alternatively, the point of interest may be associated with a particular point of the vehicle, or a particular point within the vehicle.

The height, weight, activity, activity, and/or position of the occupant may impact the point of interest. For example, the point of interest may be utilized for reducing acceleration(s) experienced at, or by, the point of interest. As the vehicle 402 travels about the environment, the point of interest may experience certain acceleration(s) depending on the steering of the vehicle 402, the suspension of the vehicle 402, the speed of the vehicle 402, and so forth. Occupant(s)

of different heights and/or weights may experience different acceleration(s). Depending on the activity of the occupant, for example, reduced accelerations may increase a comfort of the occupant. For example, if the occupant is reading, minimal accelerations experienced by the head may allow the occupant to comfortably read. By way of another example, if the occupant is working on a laptop, minimal accelerations experienced by the head and the lap may allow the occupant to comfortably work on the laptop. In other words, the activity may be used to define the point of interest for determining acceptable or comfortable accelerations experienced by the occupant. As such, the location of the occupant, characteristic(s) of the occupant, and/or an activity of the occupant may be used to define a point for which to optimize ride comfort.

At 512, the process 500 may include determining preference(s) of the occupant. For example, in some instances, the occupant may have preference(s) that indicate tolerable or preferred accelerations during travel. In some instances, for example, the occupant may be sensitive to motion sickness and prefer minimal accelerations. Other occupant(s), meanwhile, may be insensitive and may not require reduced accelerations. In some instances, the preference(s) may also be used to established threshold acceleration(s) experienced by the point of interest. In some instances, the preference(s) may be received via accessing a profile associated with the occupant, via visual indications provided by the occupant (e.g., hand gestures), audible indications provided by the occupant (e.g., voice commands), and indications provided via user interfaces within the vehicle 402. In some instances, the preference(s) may be suggested or predetermined based on an identity associated with the occupant, characteristic(s) of a route, an activity of the occupant, and so forth. For example, for elderly or young occupants, the preference(s) may be associated with limiting accelerations. Additionally, if the occupant is using a laptop during the ride, for example, the preference(s) may limit accelerations.

At 514, the process 500 may include determining, based at least in part on the point of interest and/or the preference(s), a suspension adjustment and/or a steering adjustment to the vehicle. For example, within the environment, the vehicle 402 may have a certain route along which the vehicle travels and associated speeds. Depending on the point of interest and/or preference(s), the vehicle 402 may be adjusted according to the preferred or acceptable accelerations experienced by the occupant, or at the point of interest.

In some instances, the accelerations may be modified via adjusting suspension setting(s) of the vehicle. For example, strut(s) or suspension component(s) may be disposed at corner(s), sides, edges, etc. of the vehicle 402. The strut(s) may be extended to certain lengths to either raise portions of the vehicle 402 and/or lower portions of the vehicle 402. In such instances, for example, a center of rotation of the vehicle and/or the point of interest occupant may be adjusted, which may impact acceleration. For example, if the occupant is prone to motion sickness, the strut(s) may be retracted to position the point of rotation close, or in close proximity, to the point of interest, which may reduce accelerations (e.g., swaying) experienced by the occupant. Moreover, the strut(s) may have varying levels of stiffness and/or travel. The suspension system(s) may be dynamically controlled for reducing accelerations to within acceptable range(s). Depending on the point of interest, component(s) of the suspension system(s) may be individually or independently controlled for achieving the desired acceleration(s).

Additionally, or alternatively, in some instances, the accelerations may be modified via adjusting the steering of the vehicle 402. For example, the vehicle 402 may have four-wheel steering or may be capable of steering via front wheels and/or back wheels. The combination of which wheels are used to steer the vehicle 402, as well as the amount by which the wheel(s) steer the vehicle 402, may impact accelerations experienced by the point of interest. For example, the front wheels may actuate to a certain degree and the rear wheels may actuate to a certain degree. In other instances, the front wheels may entirely steer the vehicle 402 and the rear wheels may not steer the vehicle 402, vice versa. Prior to steering, or performing a steering action, the vehicle 402 (or another communicatively coupled system) may iteratively determine accelerations at the point of interest given the different combinations of steering capabilities (e.g., four-wheel steering versus two-wheel steering). Therein, an adjustment to the steering may be made such that the experienced accelerations are within a certain threshold, satisfy tolerable limits, or satisfy the preference(s) of the occupant. This may include minimizing the magnitude and/or duration of acceleration experienced by the occupant.

In some instances, determining the suspension adjustment, or setting(s) of the suspension, may include determining independent setting(s) for each strut of the suspension system(s). For example, in instances where the vehicle 402 include a strut disposed at each corner of the vehicle 402, the suspension adjustment may include four setting(s) for each of the strut(s), where the setting(s) are associated with a respective actuation of each strut. With the different setting(s) to each of the strut(s), it is possible to create different roll and pitch accelerations. For the steering adjustment(s), or setting(s) of the steering, this may include determining setting(s) for the steering system at the front of the vehicle 402 and a for the rear of the vehicle. In such instances, two steering setting(s) may be determined (i.e., a steering setting for the front and a steering setting for the rear).

Further adjustment(s) may be made to the vehicle 402, such as changing a speed of the vehicle. The different combinations of steering, suspension, speed, braking, etc. may be modeled for selecting desired setting(s).

At 516, the process 500 may include causing performance the suspension adjustment and/or the steering adjustment. For example, after determining the suspension adjustment and/or the steering adjustment that accommodate the occupant, the preference(s), and the activity, the vehicle 402 (or another communicatively coupled system) may cause performance of at least one of the suspension adjustment and/or the steering adjustment. Noted above, performance of at least one of the suspension adjustment and/or the steering adjustment may be such that accelerations are within acceptable ranges and/or below certain thresholds. In such instances, the strut(s) of the suspension system may be extended to various lengths, the strut(s) may be configured to different degrees of stiffness, the steering of the vehicle 402 may be adjusted, and/or a speed of the vehicle 402 may be adjusted.

From 516, the process 500 may proceed to 502 whereby the process 500 may include receiving additional data for determining additional suspension adjustment(s) and/or a steering adjustment(s) to the vehicle 402. That is, as the vehicle 402 travels about the environment, data may be continuously received for determining whether to adjust the suspension and/or the steering. Additionally, as the occupant adjusts a seating position (e.g., upright, slouched, etc.), move(s) seat(s), and/or adjusts activities (e.g., reading, sleeping, etc.), for example, the point of interest may be updated for use in determining predicted accelerations for adjusting the suspension and/or steering. As such, as the vehicle 402 travels about the environment (e.g., turns, on-ramps, off-ramps, etc.), the process 500 may accommodate the occupant to increase comfort in real-time.

FIG. 600 illustrates an example process 600 for adjusting setting(s) of the vehicle 402 based on preference(s) of occupant(s), a location of occupant(s), and activities of the occupant(s) within the vehicle 402.

At 602, the process 600 may include receiving data from one or more sensor(s) associated with the vehicle. For example, the sensor(s) may include camera(s) that are disposed within an interior of the vehicle 402. Image data captured by the camera(s) may be used for determining a seat occupied by the occupants. Additionally, the image data may be used for determining characteristic(s) of the occupants, such as height, and/or an activity (or activities) of the occupants. However, the sensor(s) may additionally or alternatively include weight sensor(s) disposed seat(s) of the vehicle 402, a sensor associated with a seatbelt, or other sensor for knowing whether the occupant is/are seated. In such instances, the vehicle 402 may include respective sensors for each occupant.

At 604, the process 600 may include determining a first location of a first occupant within the vehicle. For example, based at least in part on the data received at 602, the process 600 may determine which of multiple seats the first occupant is seated in. Determining which seat the first occupant is seated within may also include a determination of whether the first occupant is rearward facing or forward facing, relative to a direction of travel of the vehicle 402.

At 606, the process 600 may include identifying a first activity of the first occupant. For example, image data captured by the camera(s) may be analyzed to identify an activity of the first occupant (e.g., accessing a laptop, engaging with a mobile device, reading, eating/drinking, sleeping, talking with other occupant(s), etc.). Discussed herein, the first activity of the first occupant may be utilized for adjusting setting(s) of the vehicle 402 to limit accelerations experienced by the first occupant. For example, if the first occupant is reading, the setting(s) may limit an amount of accelerations experienced by a head of the first occupant such that the first occupant is able to comfortably read.

At 608, the process 600 may include determining, based at least in part on the first location and/or the first activity, a first point of interest associated with reducing accelerations experienced by the first occupant. In some instances, the first point of interest may be associated with the first occupant and/or the vehicle 402. For example, the first point of interest may be associated with a CoG of the occupant or a head of the occupant. Alternatively, the point of interest may be associated with a particular point of the vehicle 402, or a particular point within the vehicle 402, about which to limit accelerations.

That is, the first point of interest may be utilized for reducing accelerations experienced at, or by, the first point of interest. For example, as the vehicle travels about the environment, the first point of interest may experience accelerations depending on the steering of the vehicle 402, the suspension of the vehicle 402, the speed of the vehicle 402, and so forth. Depending on the height and/or weight of the first occupant, for example, the first occupant may experience certain accelerations. Additionally, depending on the activity of the first occupant, for example, reduced accelerations may increase a comfort of the first occupant. For example, if the occupant is reading, minimal accelerations experienced by the head may allow the first occupant to comfortably read. As such, knowing the first location as well as the first activity of the first occupant may be used to adjust setting(s) of the vehicle 402 for increasing a comfort of the first occupant.

At 610, the process 600 may include determining, based at least in part on the first point of interest, one or more first adjustments to the vehicle. For example, after determining the first point of interest, the process 600 may determine how to adjust a speed of the vehicle 402, a steering configuration of the vehicle 402 (e.g., two-wheel, four-wheel, etc.), suspension of the vehicle 402 (e.g., stiffness, dampening, extended strut length), and so forth. In some instances, the one or more first adjustment(s), when instituted may serve to reduce accelerations experienced by the first occupant or at the first point of interest. In some instances, this may include position a point of rotation of the vehicle 402 proximal to the first point of interest.

Additionally, the one or more first adjustment(s) may produce accelerations at the first point of interest that are within a certain acceptable ranges or thresholds. For example, the first point of interest may have a threshold range of acceptable accelerations. Here, the one or more first adjustment(s) may bring the accelerations within the range of acceptable accelerations. Different combinations of steering, speed, or suspension may be implemented and/or modeled for determining the one or more first adjustment(s).

At 612, the process 600 may include determining whether a second location of a second occupant within the vehicle is received. For example, based at least in part on the data received at 602, the process 600 may determine which of multiple seats the second occupant is seated in, or whether there is a second occupant. Determining which seat the second occupant is seated within may also include a determination of whether the second occupant is rearward facing or forward facing, relative to a direction of travel of the vehicle 402.

If at 612 the process 600 determines that no indication of a second occupant was received, or determines that there is not a second occupant within the vehicle, the process 60 may follow the "NO" route and proceed to 604. However, if at 612 the process 600 determines that there is a second occupant within the vehicle, the process 600 may follow the "YES" route and proceed to 614.

At 614, the process 600 may include identifying a second activity of the second occupant. For example, image data captured by the camera(s) may be analyzed to identify an activity of the second occupant (e.g., accessing a laptop, engaging with a mobile device, reading, eating/drinking, sleeping, talking with other occupant(s), etc.). The second activity of the second occupant may be utilized for adjusting setting(s) of the vehicle 402 to limit accelerations experienced by the second occupant. For example, if the second occupant is working on a laptop, the setting(s) may limit an amount of acceleration experienced by a head and/or a lap of the second occupant such that the second occupant is able to comfortably able to work on the laptop.

At 616, the process 600 may include determining, based at least in part on the second location and/or the second activity, a second point of interest associated with reducing accelerations experienced by the second occupant. In some instances, the second point of interest may be associated with the second occupant and/or the vehicle. For example, the second point of interest may be associated with a CoG of the occupant or point between the head and the lap of the second occupant.

The second point of interest may be utilized for reducing accelerations experienced at, or by, the second point of interest. For example, as the vehicle 402 travels about the environment, the second point of interest may experience certain accelerations depending on the steering of the vehicle 402, the suspension of the vehicle 402, the speed of the vehicle 402, and so forth. Additionally, depending on the height and/or weight of the second occupant, for example, the second occupant may experience certain accelerations. Additionally, depending on the activity of the second occupant, for example, reduced accelerations may increase a comfort of the second occupant. For example, if the second occupant is working on the laptop, minimal accelerations experienced by the head and/or the lap may allow the second occupant to comfortably work. In some instances, a midpoint or point between the head of the second occupant and the lap of the second occupant may be chosen for the second point of interest given that accelerations experienced by the head may impact an ability of the second occupant to hold the laptop still or in place. Accordingly, knowing the second location as well as the second activity of the second occupant may be used to adjust setting(s) of the vehicle 402 for increasing a comfort of the second occupant.

At 618, the process 600 may include determining, based at least in part on the second point of interest, one or more second adjustment(s) to the vehicle. For example, after determining the second point of interest, the process 600 may determine how to adjust a speed of the vehicle 402, a steering configuration of the vehicle 402, suspension of the vehicle 402, and so forth. In some instances, the one or more second adjustment(s), when instituted may serve to reduce accelerations experienced by the second occupant or at the second point of interest. Additionally, the one or more second adjustment(s) may produce acceleration at the second point of interest that are within a certain acceptable range or threshold.

At 620, the process 600 may include determining, based at least in part on the one or more first adjustment(s) and/or the one or more second adjustment(s), one or more third adjustment(s) to the vehicle. For example, the process 600 may take into consideration the one or more first adjustment(s) and/or the one or more second adjustment(s) for determining one or more third adjustment(s) that accommodate both the first occupant and the second occupant. In other words, the one or more first adjustment(s) may accommodate the first occupant, but may cause unpleasant and/or uncomfortable experiences for the second occupant. Comparatively, the one or more second adjustment(s) may accommodate the second occupant but may cause unpleasant and/or uncomfortable experiences for the first occupant. Accordingly, the one or more third adjustment(s) may be determined for accommodating both the first occupant and the second occupant, or determining a compromise between the adjustment(s). In such instances, the ride comfort for one occupant may be optimized at the expense of another occupant (e.g., based on sensitivity to motion).

In some instances, the one or more first adjustment(s) and/or the one or more second adjustment(s) may be averaged or weighed to determine the one or more third adjustment(s). For example, if the one or more first adjustment(s) include adjusting a stiffness of the suspension by a first amount, extending certain strut(s) to a first length, or adjusting the steering to a first configuration, and the one or more second adjustment(s) include adjusting a stiffness of the suspension by a second amount or adjusting the steering to a second configuration, the one or more third adjustments may be a compromise between the one or more first adjustment(s) and the one or more second adjustment(s). For example, the one or more third adjustments may include adjusting a stiffness of the suspension by a third amount, extending certain strut(s) to a third length, and/or adjusting the steering to a third configuration. In some instances, the one or more third adjustment(s) may be average(s) to determine adjustment(s) associated with the first occupant and the second occupant. Moreover, in some instances, the one or more third adjustment(s) may keep accelerations to within acceptable range(s) associated with the first occupant and the second occupant, or the first point of interest and the second point of interest, respectively. As such, the one or more third adjustment(s) may represent a compromise or suitable adjustment(s) for accommodate preference(s) or acceptable acceleration(s) of the first occupant and the second occupant.

Moreover, in some instances, the one or more third adjustment(s) may include weighing the one or more first adjustment(s) and/or the one or more second adjustment(s). For example, if the first occupant is reading a book and the second occupant is working on the laptop, preference may be given to the second occupant and the second activity. In such instances, the activities may be categorized for determining acceptable accelerations. That is, the second occupant may be more susceptible or bothered by movement, as compared to the first occupant. For example, the first occupant may counteract movements of the vehicle my moving his or her hands holding the book, or the hand of the first occupant may counteract acceleration(s) experienced by the vehicle. Alternatively, it may be harder for the second occupant to counteract acceleration(s) being as the laptop may be positioned on the lap of the second occupant. In these, and other instances, the one or more third adjustment(s) may accommodate the first occupant, but more consideration or a greater weight may be applied to the one or more second setting(s) for limiting acceleration(s) or movement of the second occupant. Preference(s) of the first occupant and the occupant (e.g., sensitivities) may also be used to determine the third adjustment(s).

At 622, the process 600 may include causing performance of at least one of the one or more third adjustment(s). For example, the suspension system may be adjusted and the steering configuration may be changed (e.g., front wheel steering, rear wheel steering, etc.). From 622, the process 600 may loop to 602 for determining additional activities of the first occupant and/or the second occupant, and/or adjustment(s) to make to the vehicle 402. For example, a route traveled by the vehicle 402 may include corners, and the vehicle 402 may adjust the suspension system and/or steering systems such that the first occupant and the second occupant experience suitable levels of accelerations associated with their respective activities. Moreover, the first occupant and/or the second occupant may move seat(s), change activities, and/or update preference(s) associated with tolerable or preferred level(s) of movement. Therefore, by iteratively determining the location, activities, and/or preference(s) of the occupant(s), the vehicle may be adjusted for accommodating the occupant(s) and increasing a level of comfort.

Although the process 600 is discussed as determining adjustments for two occupants, a similar process may be performed for determining adjustments in instances where the vehicle includes more than two occupants.

Figure 7:
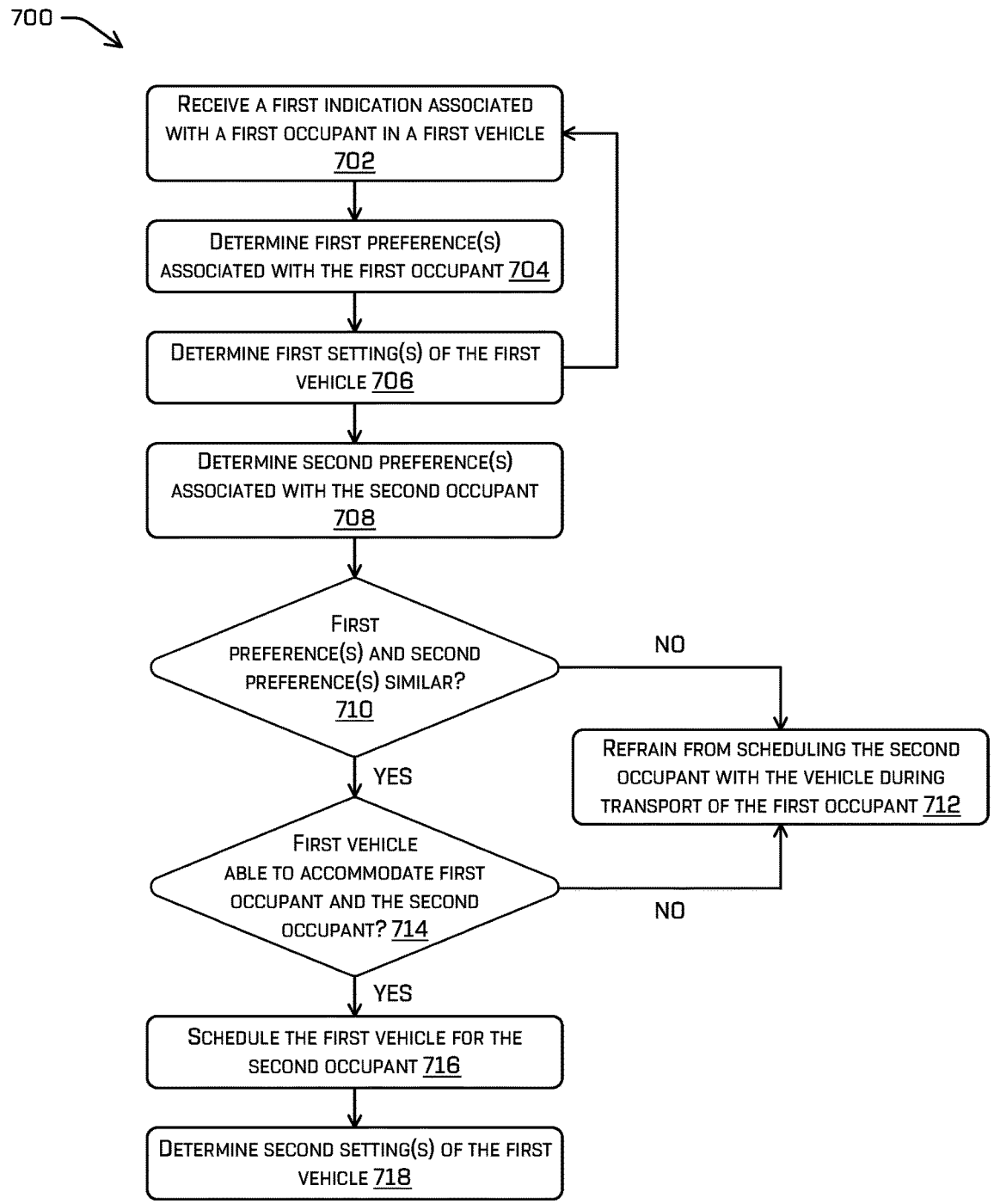
FIG. 7 illustrates an example process for scheduling rides for occupants, based on preference(s) of the occupants.

FIG. 7 illustrates an example process 700 for making adjustment(s) to the vehicle 402 or determining setting(s) to the vehicle 402 based on preference(s) of occupants. FIG. 7 may also illustrate a process 700 for scheduling rides for occupants. In such instances, to schedule rides, the computing device(s) 432 (or the scheduling component 456) may perform operations for scheduling the rides amongst occupants.

At 702, the process 700 may include receiving a first indication associated with a first occupant in a vehicle. For example, the vehicle 402 may include a weight sensor, a camera, or other sensor that detect(s) or determines that the first occupant is in the vehicle 402. In some instances, the first occupant may schedule a ride with the vehicle, for example, from a first location to a second location. In some instances, the first occupant may utilize a mobile device or application operating on the mobile device to schedule the ride.

At 704, the process 700 may include determining first preference(s) associated with the first occupant. For example, the first occupant may provide the first preference(s) as part scheduling the first ride and/or an occupant profile 454 of the first occupant may be accessed for determining the first preference(s). In some instances, the first preference(s) may indicate preferences of the first occupant such as whether the first occupant prefers to ride in particular seating location within the vehicle 402, face a certain direction relative to a direction of travel (e.g., rearward facing, forward facing, etc.), listen to certain music, talk or engage in other activities during the ride, avoid stop light(s), construction, on-ramps, off-ramps, hills, and so forth. The first preference(s) may also indicate whether the first occupant is prone to motion sickness, is sensitive to motion sickness, or has an acceptable range of accelerations. For example, the first occupant may prefer a route with less stops and braking (e.g., the first occupant may have sensitivities to accelerations), less turns (e.g., the first occupant may have sensitivities to cornering), or hills (e.g., fear of the vehicle not stopping). Additionally, the first preference(s) may also indicate a preferred climate within the vehicle 402 (e.g., air, temperature, etc.). As part of determining the first preference(s), the process 700 may determine an identity associated with the first occupant.

At 706, the process 700 may include determining first setting(s) of the vehicle. For example, based at least in part on the first preference(s) of the first occupant, heating/cooling controls of the vehicle 402 may be adjusted, air may be circulated within an interior of the vehicle 402, and/or certain music may be played within the vehicle 402. Moreover, the first setting(s) may include adjusting suspension system(s) of the vehicle 402 to a desired actuation (e.g., travel height), according to particular dampening effects, adjusting steering controls of the vehicle 402, and/or adjusting speeds of the vehicle 402. For example, if the first occupant is sensitive to motion and the vehicle 402 may travel at lower speeds, along a route that includes few corners, and/or adjust to a particular steering configuration (e.g., front wheel steering, rear wheel steering, four wheel steering, etc.). These first setting(s) may reduce acceleration(s) experienced by the first occupant while traveling throughout an environment. In some instances, the first setting(s) may be based on a location of the first occupant in the vehicle 402, an activity of the first occupant, a point of interest associated with the first occupant, and/or a center of rotation of the vehicle 402 about one or more axes.

In some instances, the first setting(s) may be instituted prior to picking up the first occupant or the first occupant entering the vehicle 402 or after the first occupant has entered the vehicle 402. Moreover, while traveling throughout the environment, or along the route of the vehicle 402, the process 700 may continuously or iteratively determine the first setting(s) for increasing a comfort of the first occupant. For example, the process 700 may loop from 706 to 702 to determine steering configuration(s) for corners, suspension setting(s) for corners, and so forth. Moreover, the vehicle 402 may be configured to determine the first preference(s) based on visual cues or audible cues issued by the first occupant throughout the ride. In such instances, the first setting(s) may be updated and/or an occupant profile associated with the first occupant may be updated for instituting the first setting(s). For example, the first occupant may utter a command, such as "Please slow down" or "I'm not feeling well." In response to these commands or cues, the vehicle may adjust the first setting(s) for accommodating the first occupant.

At 708, the process 700 may include determining second preference(s) associated with the second occupant. For example, the second occupant may provide the second preference(s) as part scheduling a ride and/or an occupant profile 454 of the second occupant may be accessed for determining the second preference(s). In some instances, the second preference(s) may include similar preference(s) listed above with regard to the first preferences (e.g., particular seating locations, route preferences, climate controls, etc.). Moreover, the second preference(s) may be determined as part of the second occupant scheduling, or attempting to schedule, a ride within an environment. As part of determining the second preference(s), the process 700 may determine an identity associated with the second occupant.

At 710, the process 700 may include determining whether the first preference(s) and the second preference(s) are similar. For example, the first preference(s) and the second preference(s) may be compared to one another for determining whether there are similarities or differences between the first preference(s) and the second preference(s). In some instances, determining whether there are similarities between the first preference(s) and the second preference(s) may include determining whether the similarities satisfy a threshold, or whether there are a certain amount of similarities that satisfy a threshold.

Additionally, or alternatively, the comparison may involve weighing certain first preference(s) against the second preference(s). For example, if the first occupant is prone to motion sickness and the second occupant does not experience motion sickness (or has a higher tolerance for motion sickness), the first preference(s) and the second preference(s) may not be similar. Here, if the first occupant and the second occupant have other similarities (e.g., climate, music, music, quite level, etc.), but the first occupant experiences motion sickness and the second occupant does not, this may outweigh the other similarities. As another example, if the first occupant prefers a colder environment as compared to the second occupant, the first preference(s) and the second preference(s) may not be similar. However, in some instances, the vehicle 402 may include separate climate controls for accommodating both the first preference(s) and the second preference(s). As such, at 710 the process 700 may determine whether the first preference(s) and the second preference(s) are compatible for scheduling the first occupant and the second occupant on a common ride (e.g., ride share).

If at 710, the process 700 determines that the first preference(s) and the second preference(s) are not similar, or otherwise determines that the first preference(s) and the second preference(s) are not compatible, the process 700 may follow the "NO" route and proceed to 712.

At 712, the process 700 may include refraining from scheduling the second occupant with the vehicle during transport of the first occupant. For example, because the first occupant and the second occupant have different preference(s), such as preferred routes, speeds, accelerations, and so forth, the process 700 may determine that the first occupant and the second occupant should not be scheduled to ride in the vehicle 402 at the same time. As a result, the process 700 may refrain from scheduling the second occupant with the first occupant in the vehicle 402. However, in some instances, the process 700 may locate or schedule another vehicle for accommodating the second occupant.

Alternatively, if at 710 the process 700 determines that the first preference(s) and the second preference(s) are similar, or otherwise determines that the first preference(s) and the second preference(s) are compatible, the process 700 may follow the "YES" route and proceed to 714.

At 714, the process 700 may include determining whether the vehicle is able to accommodate the first occupant and the second occupant. For example, in addition to determining whether the first occupant and the second occupant have similar preference(s), the process 700 may determine whether the vehicle 402 has a seat for the second occupant and is otherwise able to adjust the first setting(s) of the vehicle 402 for accommodating the second occupant. For example, if the first occupant and the second occupant both experience motion sickness, and therefore have similar preference(s) (e.g., slow speed, stiffened suspension, etc.), but both the first occupant and the second occupant prefer to be rearward facing, the process 700 may determine whether the vehicle 402 has a rearward seat for the second occupant. As another example, despite having similar preference(s), adjusting the setting(s) of the vehicle to accommodate the second occupant may upset or disturb the setting(s) or the first preference(s) of the first occupant. In such instances, the process 700 may determine whether the first setting(s) may be adjusted for accommodating both the first preference(s) and the second preference(s). That is, the first preference(s) of the first occupant may be acceptable if the first setting(s) are within certain ranges or threshold (e.g., an amount of acceleration, movement, speed, etc.). If the first setting(s) is/are able to be adjusted to accommodate the first preference(s) of the first occupant and the second preference(s) of the second occupant, the process 700 may determine that the vehicle is able to accommodate the first occupant and the second occupant. Whether the vehicle 402 is able to accommodate the second occupant may also include whether a requested travel route of the first occupant and the second occupant align are compatible.

If at 714, the process 700 determines that the vehicle 402 is not able to accommodate the first occupant and the second occupant, the process 700 may follow the "NO" route and proceed to 712 and refrain from scheduling the second occupant to the vehicle 402 with the first occupant. Alternatively, if at 714 the process 700 determines that the vehicle is able to accommodate the first occupant and the second occupant, the process 700 may follow the "YES" route and proceed to 716.

At 716, the process 700 may include scheduling the vehicle for the second occupant. For example, in instances where the vehicle 402 is able to accommodate the first occupant and the second occupant, the process 700 may assign or schedule the vehicle 402 to pick up the second occupant. As part of scheduling the vehicle 402, a confirmation or indication may be sent to the mobile device of the second occupant.

At 718, the process 700 may include determining second setting(s) of the vehicle. For example, as the vehicle 402 may include both the first occupant and the second occupant, the process 700 may include determining second setting(s) for the first occupant and the second occupant within the vehicle 402. In some instances, the second setting(s) may be determined, or calculated, based at least in part on the first preference(s) and/or the second preference(s), and/or the first setting(s) associated with the first occupant. After determining the second setting(s), the vehicle 402 may adjust according to desired suspension setting(s), steering setting(s), and so forth.

In some instances, the first setting(s) and/or the second setting(s) may be suggested or predetermined setting(s). For example, if an occupant is susceptible to motion sickness due to riding backwards and/or high acceleration maneuvers, the setting(s) may include changing a direction of travel of the vehicle. Additionally, the setting(s) may be associated with elderly or young occupants. If the occupant is determined to be elderly, for example, the vehicle may institute predetermined setting(s) for traveling at lower speeds and/or reducing accelerations. Setting(s) may additionally or alternatively be determined based on a planned activity of the occupant (e.g., if the occupant uses a laptop during the ride, for example). In some instances, setting(s) may be selected based on a time or destination associated with the occupant and/or may be determined based on prior rides and/or feedback provided by the occupant.

Figure 8:
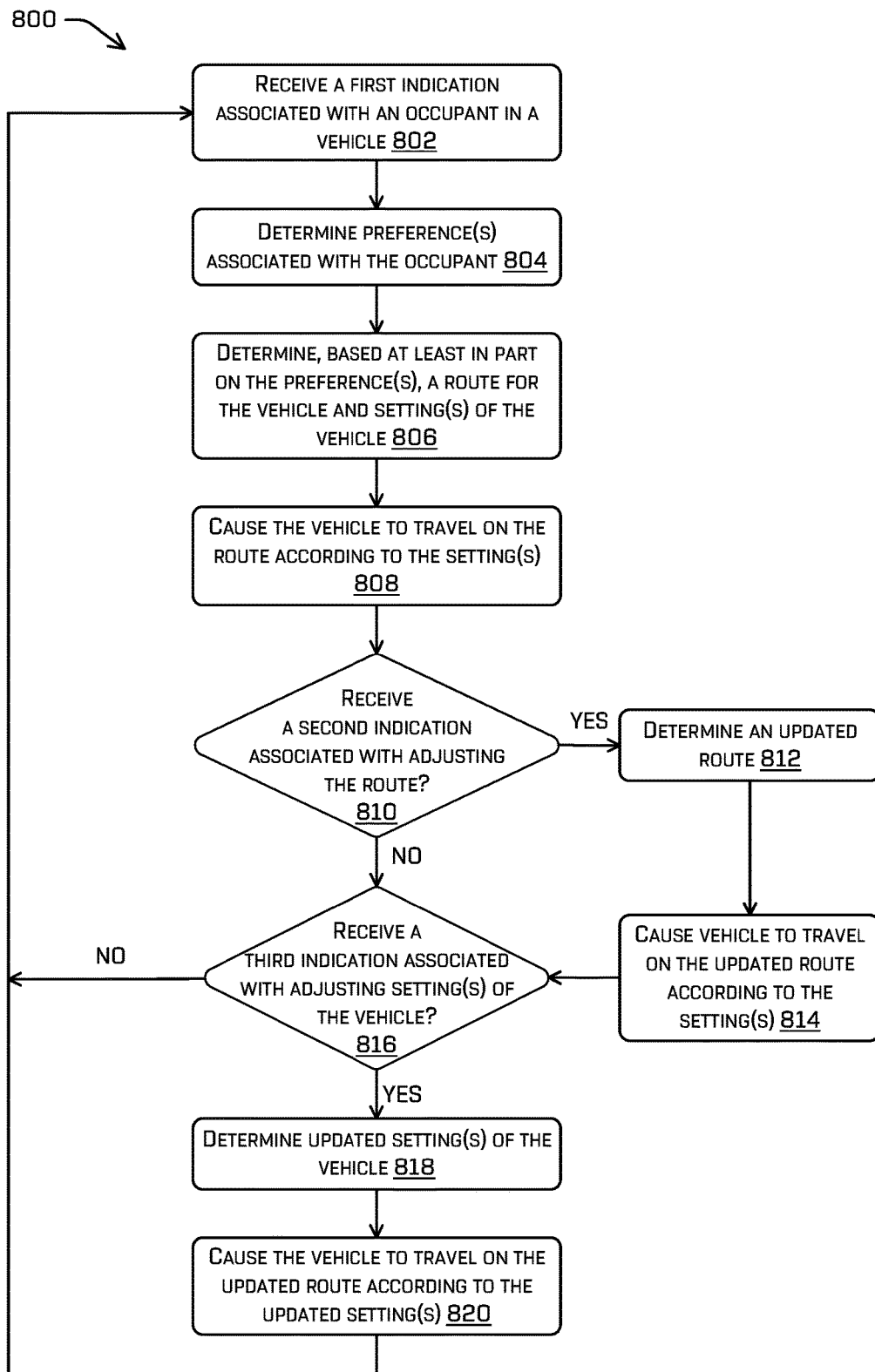
FIG. 8 illustrates an example process for adjusting setting(s) of the vehicle.

FIG. 8 illustrates an example process 800 for determining a route for the vehicle 402, setting(s) for the vehicle 402, and making adjustment(s) to the vehicle 402 to increase comfort along the route, such as during a maneuver performed by the vehicle.

At 802, the process 800 may include receiving a first indication associated with an occupant in a vehicle. For example, the vehicle 402 may include a weight sensor, a camera, or other sensor that detect(s) or determines that the occupant is in the vehicle 402. In some instances, the occupant may schedule a ride with the vehicle 402, for example, using a mobile device of the occupant.

At 804, the process 800 may include determining preference(s) associated with the occupant. For example, in some instances, the occupant may provide the preference(s) as part scheduling a ride with the vehicle 402 and/or the occupant profile 454 of the occupant may be accessed for determining the preference(s). In some instances, the preference(s) may indicate preferences of the occupant such as a preferred seating location, a preferred route, preferred accelerations, sensitivities to motions, a preferred climate, and so forth. Moreover, as part of determining the preference(s), the process 800 may determine the identity of the occupant or an identity associated with the occupant. For example, the identity of the occupant may be determined based on the occupant scheduling a ride with the vehicle, an indication received from a mobile device of the occupant, biometric sensors, etc.

At 806, the process 800 may include determining, based at least in part on the preference(s), a route for the vehicle and/or setting(s) of the vehicle. For example, if the occupant is sensitive to motion, a route may be determined that has minimal accelerations, turning, and so forth. In some instances, this may include determining a route that is slower, as compared to other routes, for reducing accelerations experienced by the occupant. Additionally, the setting(s) may relate to heating/cooling controls of the vehicle 402 and air may be circulated within an interior of the vehicle 402 according to the preference(s). By way of another example, the setting(s) may include adjusting suspension system(s) of the vehicle 402 to a desired actuation (e.g., travel height), adjusting steering controls of the vehicle 402, and/or adjusting speeds of the vehicle 402. That is, adjusting the steering (e.g., front wheel steering, rear wheel steering, four wheel steering, etc.) and/or suspension (e.g., travel height) may reduce acceleration(s) experienced by the occupant while traveling throughout an environment. In some instances, and as discussed hereinabove, the location of the occupant within the vehicle 402 and/or an activity of the occupant may additionally, or alternatively, be used for determining the route and/or the setting(s). In some instances, the route may be determined based on a current location of the occupant, a destination location, and/or the preference(s) of the occupant.

At 808, the process 800 may include causing the vehicle to travel along the route with the setting(s). For example, the vehicle 402 may travel along the route, and according to the setting(s), to reduce accelerations experienced by the occupant and for accommodating the occupant. The vehicle 402 may receive the route, or determine the route, from the computing device(s) 432 and/or the scheduling component 456. In some instances, this may increase a comfort, productivity, or experience of the occupant. However, the vehicle 402 may also perform various maneuvers along the route with the setting(s). In other words, for a particular maneuver, the process 800 may determine the setting(s) at which the vehicle 402 is to implement.

At 810, the process 800 may include determining whether a second indication is received associated with adjusting the route. For example, as the vehicle 402 travels along the route, the vehicle 402 may adjust the route to avoid scenarios that would discomfort the occupant. For example, the vehicle 402 may determine that a roundabout is along the route and may adjust the route to avoid the roundabout. Alternatively, the occupant may provide an indication that the route is too bumpy, too windy, and/or is otherwise discomforting. This real-time feedback may be analyzed to determine solution(s) for adjusting the route and increasing a comfort of the occupant. If at 810 the process 800 determines that the second indication is received, the process 800 may follow the "YES" route and proceed to 812.

At 812, the process 800 may include determining an updated route. For example, if the current route is too bumpy, includes too many corners, or includes a speed limit that is uncomfortable to the occupant, an updated route that is less bumpy, includes less corners, and/or has a speed limit more comfortable to the occupant may be determined. Alternatively, the occupant may request that the vehicle 402 travel along a faster route if, for example, the occupant is running late to an appointment. In some instances, the updated route may be determined based on a current location of the occupant along the route, a destination location, and/or the preference(s) of the occupant.

At 814, the process 800 may include causing the vehicle to travel on the updated route according to the setting(s). For example, after determining the updated route, based on the second indication, the vehicle 402 may travel along the updated route. This may include traveling along the updated route according to the setting(s) as determined at 806, as well as satisfying the preference(s) of the occupant.

At 816 the process 800 may include determining whether a third indication is received associated with adjusting the setting(s) of the vehicle. For example, the occupant may adjust air circulation within the vehicle 402. Additionally, the vehicle 402 may determine to adjust the setting(s) according to the preference(s). For example, based at least in part on the updated route, the steering and/or the suspension system(s) of the vehicle 402 may be adjusted to limit accelerations of the occupant (e.g., minimizing magnitude and/or duration of acceleration experienced by an occupant). In some instances, the third indication may be received via mobile device of the occupant indicating the occupant is getting sick, wishes to slow down, or requesting air. Additionally, or alternatively, the occupant may utter commands, provide hand gestures, and/or interact with an interface within the vehicle 402 for adjusting the setting(s).

As also shown, the process 800 may proceed to 816 as a result of determining that the second indication was not received associated with adjusting the route, following the "NO" route from 810.

If at 816 the process 800 does not receive the third indication, the process 800 may follow the "NO" route and proceed to 802. Therein, the process 800 may determine whether the occupant is still located in the vehicle 402 for use in accommodating the occupant and determining setting(s) of the vehicle 402. As such, the setting(s) of the vehicle 402 may be adjusted dynamically as the vehicle 402 travels along the route (or updated route) and performs different maneuvers. Alternatively, if at 816 the process 800 receives the third indication, the process 800 may follow the "YES" route and proceed to 818.

At 818 the process 800 may include determining updated setting(s) for the vehicle. For example, the vehicle 402 may adjust suspension setting(s) to reduce accelerations experienced by the occupant, may increase an air flow to the occupant (if the vehicle 402 detects that the occupant is becoming sick), and so forth. Moreover, in one instance, if the occupant is become sick, the vehicle may alter a leading or from edge of the vehicle 402 to either make the occupant forward facing or rearward facing. For example, the vehicle 402 may be bi-directional and capable of traveling in multiple directions, or changing a directional of travel relative to the occupant.

At 820, the process 800 may include causing the vehicle to travel on the updated route according to the updated setting(s). For example, based on determining the updated setting(s) for accommodate the occupant, the vehicle 402 may make one or more adjustment(s) to the vehicle 402 according to the updated setting(s). From 820, the process 800 may loop to 802 whereby the process may adjust dynamically as the vehicle 402 travels along the updated route and performs different maneuvers.

In some instances, some or all of the process 800 may be performed by the computing device(s) 432. In such instances, the computing device(s) 432 may communicatively couple to the vehicle computing device(s) 404 via the network(s) 434. For example, the computing device(s) 432 may determine the updated route and/or the setting(s) and then transmit instructions to the vehicle computing device(s) 402 for traveling on the updated route and according to the setting(s). In response to the instructions, the vehicle computing device(s) may control or instruct system(s) of the vehicle 402, such as the suspension system(s) 444 and/or the steering system(s) 446, to configuration according to the instruction(s).

In some instances, at the completion of a route or during the route, the occupant may provide a review. For example, as part of traveling along the route, the occupant may provide reviews or comments associated with the vehicle 402. The reviews, in some instances, may indicate ratings of an experience of the occupant (e.g., good, poor, etc.), particular portions of the route that were uncomfortable, updated preference(s) or changes the occupant prefers, and so forth. In some instances, the review may be used for updating the occupant profile 454 and/or future routes or setting(s) of the occupant and/or other occupant(s). For example, if the occupant experienced motion sickness during the route, the vehicle 402 may avoid the route and/or traveling along the route with the setting(s) in future instances.

Additionally, although the process 800 is described as adjusting according to setting(s) of a single occupant, the vehicle 402 may accommodate and/or adjust for multiple occupants. For example, in some instances, the vehicle 402 may include separate climate control zones and may adjust the zones accordingly based on respective preference(s) of the occupants. Additionally, in some instances, both of the occupants are sensitive to motion, but one occupant is forward facing and one occupant is rearward facing, the rearward facing occupant may be instructed to move or relocated to another forward facing seat (if available). That is, in instances where the vehicle 402 adjusts to accommodate one occupant, this may lead to unpleasant experiences for another occupant (e.g., greater accelerations, etc.). However, to better accommodate both occupants, as compared to a single occupant, if both occupants were sitting closer together then accelerations experienced by the occupants may be decreased.

EXAMPLE CLAUSES

The following paragraphs describe various examples. Any of the examples in this section may be used with any other of the examples in this section and/or any of the other examples or embodiments described herein.

- A: A system comprising: a processor; and non-transitory computer-readable media storing computer-executable instructions that, when executed by the processor, cause the system to perform operations comprising: receiving an indication associated with an occupant scheduling a ride; determining a profile associated with the occupant; determining, based at least in part on the profile, a preference of the occupant associated with the ride, the preference comprising at least one of: a preferred seating location; a preferred seating direction relative to a direction of travel; a threshold acceleration associated with the ride; or a threshold speed associated with the ride; determining a vehicle that is able to accommodate the preference of the occupant; scheduling the vehicle for the occupant; and dispatching the vehicle to pick up the occupant.
- B: The system of paragraph A, the operations further comprising: receiving a second indication associated with a second occupant scheduling a second ride; determining a second preference of the second occupant associated with the second ride; determining a similarity between the preference and the second preference; and based at least in part on the similarity, at least one of: scheduling the vehicle for the second occupant, wherein at least a portion of the ride and the second ride are concurrent; or scheduling a second vehicle for the occupant.
- C: The system of paragraph A or B, the operations further comprising transmitting, to the vehicle, the preference of the occupant, wherein the vehicle is configured to determine at least one of a suspension system or a steering system for minimizing acceleration of the occupant based at least in part on the preference.
- D: The system of any of paragraphs A-C, the operations further comprising: determining a route associated with the ride; receiving, from a device of the occupant, second data while the vehicle is in transit along the route; and transmitting, to the vehicle, the second data.
- E: A method comprising: receiving an indication associated with an occupant scheduling a ride with a vehicle; determining an identity associated with the occupant; determining, based at least in part on the identity, a preference associated with the occupant; determining, based at least in part on the preference, a setting for the vehicle; dispatching, based on the setting, a first vehicle from among a plurality of vehicles, to pick up the occupant wherein the first vehicle implements the setting.
- F: The method of paragraph E, wherein: the preference is associated with a sensitivity of the occupant to motion; and the setting comprises a suspension setting, a steering setting, an acceleration limit, or a speed setting to accommodate the sensitivity of the occupant to motion.
- G: The method of paragraph E or F, further comprising: determining, based at least in part on the preference, a route associated with the ride; and transmitting data associated with the route to the vehicle.
- H: The method of any of paragraphs E-G, wherein the preference comprises at least one of: a preferred seating location within the vehicle; a preferred seating direction relative to a direction of travel; a threshold acceleration associated with the ride; or a threshold speed associated with the ride.
- I: The method of any of paragraphs E-H, further comprising: receiving feedback associated with the ride; and determining a second preference associated with the occupant; and storing the second preference in association with a profile of the occupant.
- J: The method of any of paragraphs E-I, further comprising: determining that the vehicle is able to accommodate the preference of the occupant; and scheduling the vehicle for the occupant.
- K: The method of any of paragraphs E-J, further comprising: receiving a second indication associated with a second occupant scheduling a second ride; determining a second preference of the second occupant associated with the second ride; determining a similarity between the preference and the second preference; and based at least in part on the similarity, scheduling the vehicle for the second occupant, wherein at least a portion of the ride and the second ride are concurrent.
- L: The method of any of paragraphs E-K, further comprising: receiving a second indication associated with a second occupant scheduling a second ride; determining a second preference of the second occupant associated with the second ride; determining a similarity between the preference and the second preference; and based at least in part on the similarity, scheduling a second vehicle for the second occupant.
- M: The method of any of paragraphs E-L, further comprising: receiving, from a device of the occupant, a second indication associated with the ride, the second indication being associated with at least one of: circulating air within an interior of the vehicle; adjusting a climate within the interior; or opening a window of the vehicle; and sending, to the vehicle, an instruction for the vehicle to perform an association associated with the second indication.
- N: The method of any of paragraphs E-M, further comprising: receiving, from a sensor of the vehicle, data associated with the occupant; determining, based at least in part on the data, an action associated with minimizing acceleration of the occupant; and transmitting, to the vehicle, the action.

O: One or more non transitory computer readable media storing instructions executable by a processor, wherein the instructions, when executed, cause the processor to perform operations comprising: receiving an indication associated with an occupant scheduling a ride with a vehicle; determining an identity associated with the occupant; determining, based at least in part on the identity, a preference associated with the occupant; determining, based at least in part on the preference, a setting for the vehicle; and dispatching, based on the setting, a first vehicle from among a plurality of vehicles, to pick up the occupant wherein the first vehicle implements the setting.

P: The one or more non transitory computer readable media of paragraph O, the operations further comprising: determining, based at least in part on the preference, a route associated with the ride; and transmitting data associated with the route to the vehicle.

Q: The one or more non transitory computer readable media of paragraph O or P, wherein: the preference is associated with a sensitivity of the occupant to motion; and the setting comprises a suspension setting, a steering setting, an acceleration limit, or a speed setting to accommodate the sensitivity of the occupant to motion.

R: The one or more non transitory computer readable media of any of paragraphs O-Q, the operations further comprising: receiving, from a sensor of the vehicle, data associated with the occupant; determining, based at least in part on the data, an action associated with minimizing acceleration of the occupant; and transmitting, to the vehicle, the action.

S: The one or more non transitory computer readable media of any of paragraphs O-R, the operations further comprising: receiving a second indication associated with a second occupant scheduling a second ride; determining a second preference of the second occupant associated with the second ride; determining a similarity between the preference and the second preference; and based at least in part on the similarity, one of: scheduling the vehicle for the second occupant, wherein at least a portion of the ride and the second ride are concurrent; or scheduling a second vehicle for the second occupant.

T: The one or more non transitory computer readable media of any of paragraphs O-S, the operations further comprising: determining, based at least in part on the preference, a route associated with the ride; and transmitting data associated with the route to the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
    a processor; and
    non-transitory computer-readable media storing computer-executable instructions that, when executed by the processor, cause the system to perform operations comprising:
    receiving an indication associated with a first occupant scheduling a first ride;
    determining a profile associated with the first occupant;
    determining, based at least in part on the profile, a first vehicle operation preference of the first occupant associated with the first ride prior to picking up the first occupant, the first vehicle operation preference comprising at least one of:
        a threshold acceleration associated with the first ride; or
        a threshold speed associated with the first ride;
    determining a vehicle that is able to accommodate the first vehicle operation preference of the first occupant;
    scheduling the vehicle for the first occupant;
    dispatching the vehicle to pick up the first occupant;
    receiving a second indication associated with a second occupant scheduling a second ride;
    scheduling the vehicle for the second occupant, wherein at least a portion of the first ride and the second ride are concurrent;
    determining a first point of interest associated with the first occupant;
    determining a second point of interest associated with the second occupant;
    weighting the first point of interest and the second point of interest;
    determining, based in part on the weighting, a single point of interest; and
    instructing the vehicle to align a point of rotation of the vehicle along one or more axes at the single point of interest.

2. The system of claim 1, the operations further comprising transmitting, to the vehicle, the first vehicle operation preference of the first occupant, wherein the vehicle is configured to determine at least one of a suspension system or a steering system for minimizing acceleration of the first occupant based at least in part on the first vehicle operation preference.

3. The system of claim 1, the operations further comprising:
    determining a route associated with the first ride;
    receiving, from a device of the first occupant, second data while the vehicle is in transit along the route; and
    transmitting, to the vehicle, the second data.

4. The system of claim 1, the operations further comprising:

identifying, based in part on image data, an activity of the first occupant; and adjusting a setting of the vehicle based at least in part on the activity.

5. The system of claim 1, the operations further comprising:

determining a second vehicle operation preference of the second occupant;

determining a similarity between the first vehicle operation preference and the second vehicle operation preference; and wherein scheduling the vehicle for the second occupant is based at least in part on the similarity.

6. A method comprising:

receiving an indication associated with a first occupant scheduling a first ride with a vehicle;

determining an identity associated with the first occupant;

determining, based at least in part on the identity, a first vehicle operation preference associated with the first occupant;

determining, based at least in part on the first vehicle operation preference, a setting for the vehicle prior to picking up the first occupant;

dispatching, based on the setting, a first vehicle from among a plurality of vehicles, to pick up the first occupant wherein the first vehicle implements the setting;

receiving a second indication associated with a second occupant scheduling a second ride;

scheduling the vehicle for the second occupant, wherein at least a portion of the first ride and the second ride are concurrent;

determining a first point of interest associated with the first occupant;

determining a second point of interest associated with the second occupant;

weighting the first point of interest and the second point of interest;

determining, based in part on the weighting, a single point of interest; and instructing the vehicle to align a point of rotation of the vehicle along one or more axes at the single point of interest.

7. The method of claim 6, wherein:

the first vehicle operation preference is associated with a sensitivity of the first occupant to motion; and the setting comprises a suspension setting, a steering setting, an acceleration limit, or a speed setting to accommodate the sensitivity of the first occupant to motion.

8. The method of claim 6, further comprising:

determining, based at least in part on the first vehicle operation preference, a route associated with the first ride; and transmitting data associated with the route to the vehicle.

9. The method of claim 6, wherein the first vehicle operation preference comprises at least one of:

a threshold acceleration associated with the first ride; or a threshold speed associated with the first ride.

10. The method of claim 6, further comprising:

receiving feedback associated with the first ride; and determining an updated vehicle operation preference associated with the first occupant; and storing the updated vehicle operation preference in association with a profile of the first occupant.

11. The method of claim 6, further comprising:

determining that the vehicle is able to accommodate the first vehicle operation preference of the first occupant; and scheduling the vehicle for the first occupant.

12. The method of claim 6, further comprising:

receiving, from a sensor of the vehicle, data associated with the first occupant;

determining, based at least in part on the data, an action associated with minimizing acceleration of the first occupant; and transmitting, to the vehicle, the action.

13. The method of claim 6 further comprising:

determining a second vehicle operation preference of the second occupant;

determining a similarity between the first vehicle operation preference and the second vehicle operation preference; and wherein scheduling the vehicle for the second occupant is based at least in part on the similarity.

14. One or more non transitory computer readable media storing instructions executable by a processor, wherein the instructions, when executed, cause the processor to perform operations comprising:

receiving a first indication associated with a first occupant scheduling a first ride with a vehicle;

determining an identity associated with the first occupant;

determining, based at least in part on the identity, a first preference associated with the first occupant;

determining, based at least in part on the first preference, a setting for the vehicle prior to picking up the first occupant; and dispatching, based on the setting, a first vehicle from among a plurality of vehicles, to pick up the first occupant wherein the first vehicle implements the setting;

receiving a second indication associated with a second occupant scheduling a second ride;

scheduling the vehicle for the second occupant, wherein at least a portion of the first ride and the second ride are concurrent;

determining a first point of interest associated with the first occupant;

determining a second point of interest associated with the second occupant;

weighting the first point of interest and the second point of interest;

determining, based in part on the weighting, a single point of interest; and instructing the vehicle to align a point of rotation of the vehicle along one or more axes at the single point of interest.

15. The one or more non transitory computer readable media of claim 14, wherein:

the first preference is associated with a sensitivity of the first occupant to motion; and the setting comprises a suspension setting, a steering setting, an acceleration limit, or a speed setting to accommodate the sensitivity of the first occupant to motion.

16. The one or more non transitory computer readable media of claim 14, the operations further comprising:

receiving, from a sensor of the vehicle, data associated with the first occupant;

determining, based at least in part on the data, an action associated with minimizing acceleration of the first occupant; and transmitting, to the vehicle, the action.

17. The one or more non transitory computer readable media of claim 14, the operations further comprising:

determining a second preference of the second occupant associated with the second ride;

determining a similarity between the first preference and the second preference; and based at least in part on the similarity, scheduling the vehicle for the second occupant, wherein at least a portion of the first ride and the second ride are concurrent.

18. The one or more non transitory computer readable media of claim 14, wherein the first preference comprises at least one of:

a preferred seating location within the vehicle;

a preferred seating direction relative to a direction of travel;

a threshold acceleration associated with the first ride; or a threshold speed associated with the first ride.

19. The one or more non transitory computer readable media of claim 14, the operations further comprising:

determining a route for the first ride based at least in part on the first preference;

receiving a third indication indicating that the route is uncomfortable for the first occupant, wherein the third indication comprises receiving feedback during the first ride from the first occupant including at least one of a voice command, gesture, visual cue, or an input at an interface within the vehicle; and determining, based at least in part on the third indication, an updated route.

20. The one or more non transitory computer readable media of claim 14, wherein determining the setting of the vehicle comprises determining independent settings for individual struts of a suspension system.

\* \* \* \* \*